US009021132B2

(12) United States Patent
Kano

(10) Patent No.: US 9,021,132 B2
(45) Date of Patent: Apr. 28, 2015

(54) ADDRESS TRANSLATION METHOD, ADDRESS TRANSLATION PROXY RESPONSE METHOD, ADDRESS TRANSLATION DEVICE, AND ADDRESS TRANSLATION PROXY RESPONSE DEVICE

(75) Inventor: Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 13/356,754

(22) Filed: Jan. 24, 2012

(65) Prior Publication Data
US 2012/0191875 A1    Jul. 26, 2012

(30) Foreign Application Priority Data
Jan. 24, 2011 (JP) .................................. 2011-012367

(51) Int. Cl.
G06F 15/16 (2006.01)
H04L 29/12 (2006.01)
(52) U.S. Cl.
CPC .......... *H04L 61/103* (2013.01); *H04L 61/2553* (2013.01); *H04L 61/2532* (2013.01)
(58) Field of Classification Search
USPC ................................................ 709/230, 245
See application file for complete search history.

(56) References Cited

U.S. PATENT DOCUMENTS

| 5,815,668 | A |   | 9/1998 | Hashimoto |     |
|-----------|---|---|--------|-----------|-----|
| 5,835,726 | A | * | 11/1998 | Shwed et al. ................. | 709/229 |
| 7,620,033 | B2 | * | 11/2009 | Chu et al. ..................... | 370/352 |
| 7,908,651 | B2 | * | 3/2011 | Maher .............................. | 726/12 |
| 2004/0215752 | A1 |   | 10/2004 | Satapati et al. | |
| 2006/0095587 | A1 | * | 5/2006 | Bhattacharya et al. ....... | 709/245 |
| 2010/0312901 | A1 | * | 12/2010 | Noyranen et al. ............ | 709/228 |

FOREIGN PATENT DOCUMENTS

| JP | 08-186569 A | 7/1996 |
|----|-------------|--------|
| JP | 08-256173 A | 10/1996 |
| JP | 2003-008612 | 1/2003 |
| JP | 2005-033302 A | 2/2005 |
| JP | 2005-252315 | 9/2005 |
| JP | 2010-278584 | 12/2010 |

OTHER PUBLICATIONS

JPOA—Office Action dated Apr. 22, 2014 issued with respect to the Japanese Application No. 2011-012367, with English translation of the Office Action.

* cited by examiner

*Primary Examiner* — Phuoc Nguyen
(74) *Attorney, Agent, or Firm* — Fujitsu Patent Center

(57) ABSTRACT

An address translation device includes an address translation part containing information on correspondence between pseudo addresses and real addresses of a first network and a second network having respective address spaces independent of each other, the first network and the second network being connected by multiple address translation devices including the address translation device; an address translation request reception part configured to receive an address translation request with respect to a pseudo IP address contained in the address translation part; an address resolution response determination part configured to determine whether to respond to the address translation request in accordance with a predetermined rule based on the source address of the received address translation request; and a response part configured to respond to the address translation request based on the determination by the address resolution response determination part.

10 Claims, 24 Drawing Sheets

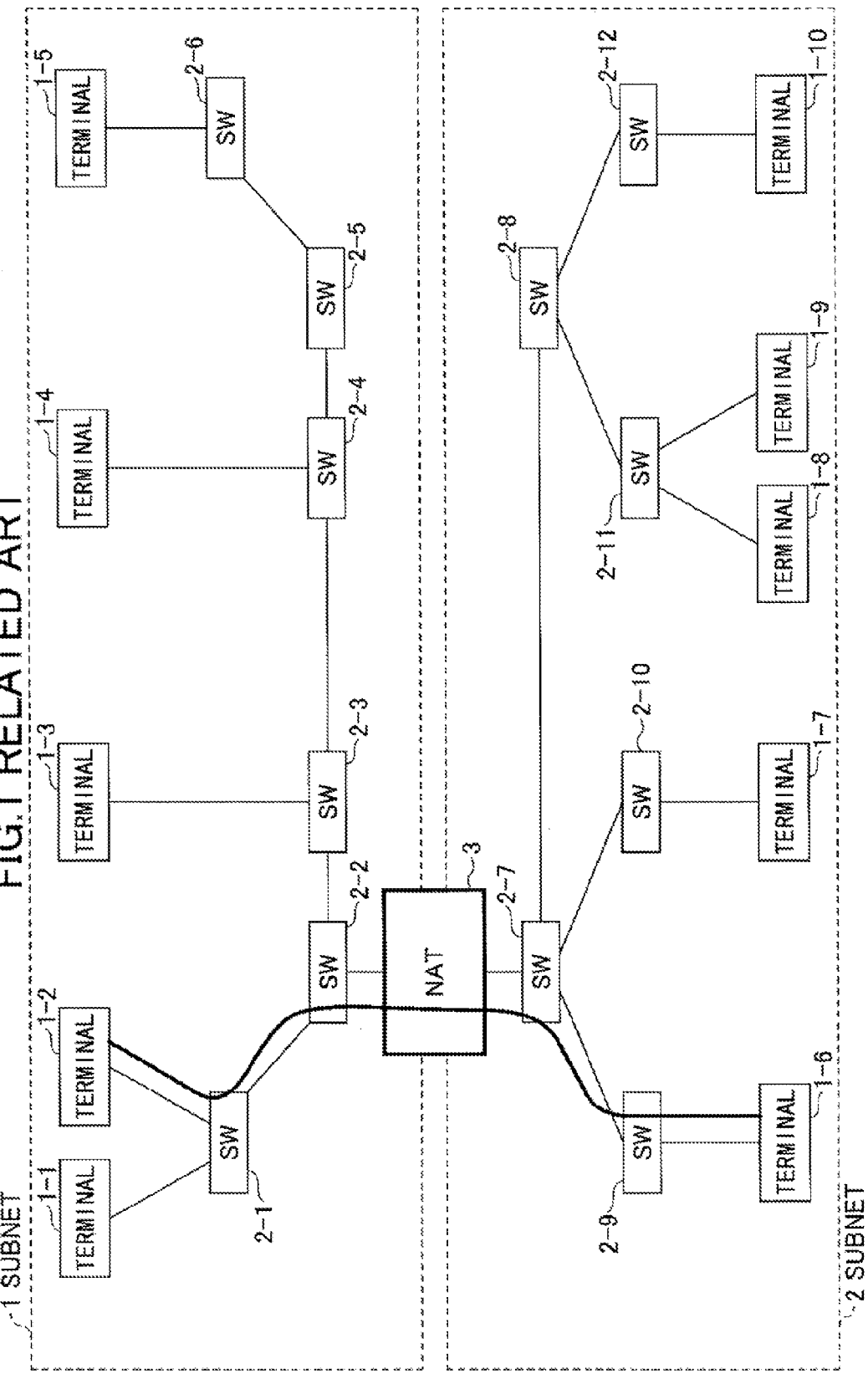

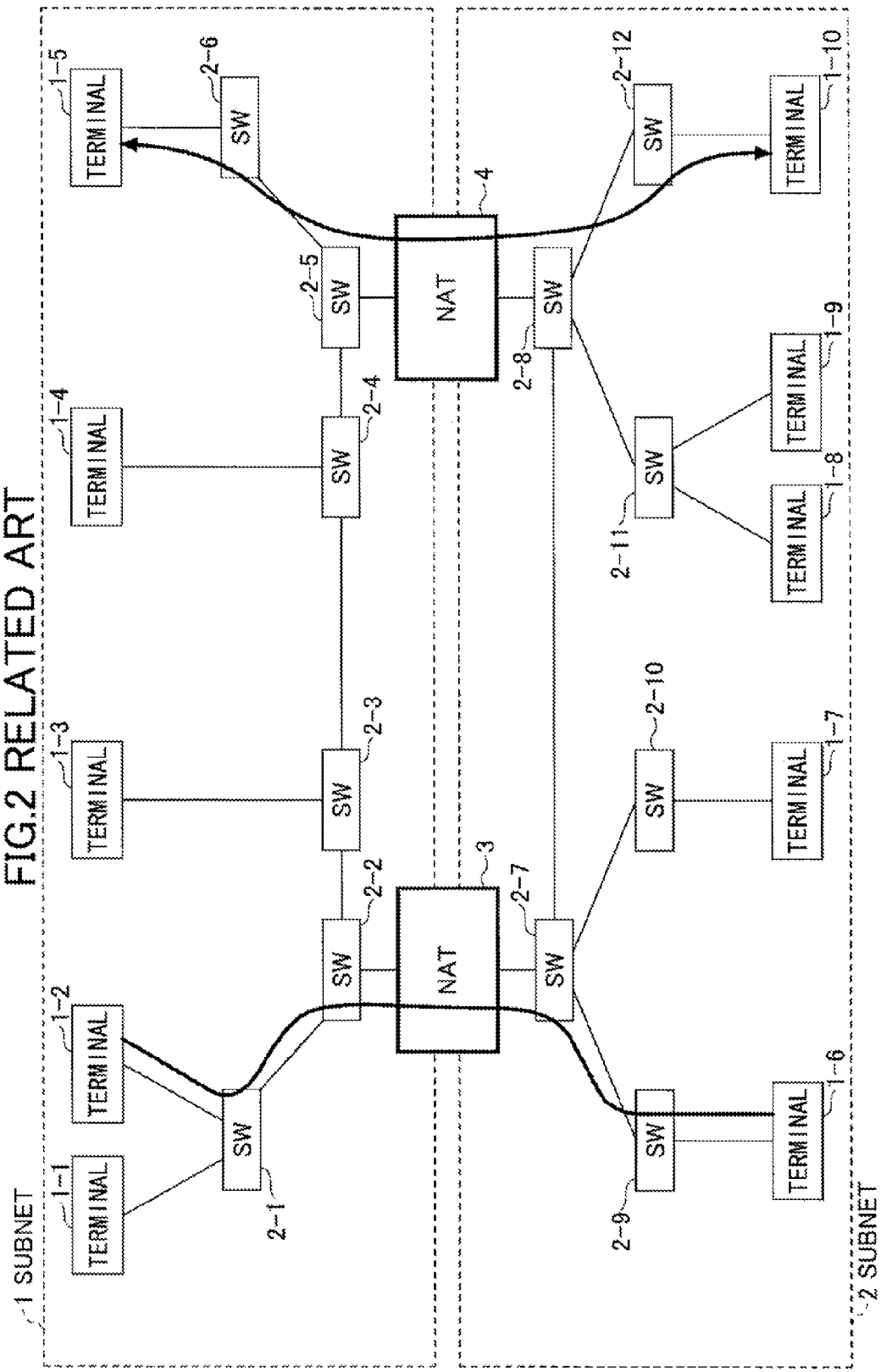

FIG.3A RELATED ART

| PSEUDO IP ADDRESS DESTINATION IP ADDRESS OF RECEIVED PACKET | REAL IP ADDRESS OF CORRESPONDING TERMINAL = DESTINATION IP ADDRESS OF TRANSMISSION PACKET |
|---|---|
| 192.168.1.11 | 192.168.100.1 (TERMINAL 1-6) |
| 192.168.1.12 | 192.168.100.2 (TERMINAL 1-7) |
| 192.168.1.13 | 192.168.100.3 (TERMINAL 1-8) |
| 192.168.100.11 | 192.168.1.1 (TERMINAL 1-1) |
| 192.168.100.12 | 192.168.1.2 (TERMINAL 1-2) |

FIG.3B RELATED ART

| PSEUDO IP ADDRESS<br>=DESTINATION IP ADDRESS OF RECEIVED PACKET | REAL IP ADDRESS OF CORRESPONDING TERMINAL<br>=DESTINATION IP ADDRESS OF TRANSMISSION PACKET |
|---|---|
| 192.168.1.14 | 192.168.100.4 (TERMINAL 1-9) |
| 192.168.1.15 | 192.168.100.5 (TERMINAL 1-10) |
| 192.168.100.13 | 192.168.1.3 (TERMINAL 1-3) |
| 192.168.100.14 | 192.168.1.4 (TERMINAL 1-4) |
| 192.168.100.15 | 192.168.1.5 (TERMINAL 1-5) |

FIG.3C RELATED ART

| SOURCE IP ADDRESS<br>= SOURCE IP ADDRESS OF RECEIVED PACKET | PSEUDO IP ADDRESS<br>= SOURCE IP ADDRESS OF TRANSMISSION PACKET |
|---|---|
| 192.168.1.1 (TERMINAL 1-1) | 192.168.100.11 |
| 192.168.1.2 (TERMINAL 1-2) | 192.168.100.12 |
| 192.168.1.3 (TERMINAL 1-3) | 192.168.100.13 |
| 192.168.1.4 (TERMINAL 1-4) | 192.168.100.14 |
| 192.168.1.5 (TERMINAL 1-5) | 192.168.100.15 |
| 192.168.100.1 (TERMINAL 1-6) | 192.168.1.11 |
| 192.168.100.2 (TERMINAL 1-7) | 192.168.1.12 |
| 192.168.100.3 (TERMINAL 1-8) | 192.168.1.13 |
| 192.168.100.4 (TERMINAL 1-9) | 192.168.1.14 |
| 192.168.100.5 (TERMINAL 1-10) | 192.168.1.15 |

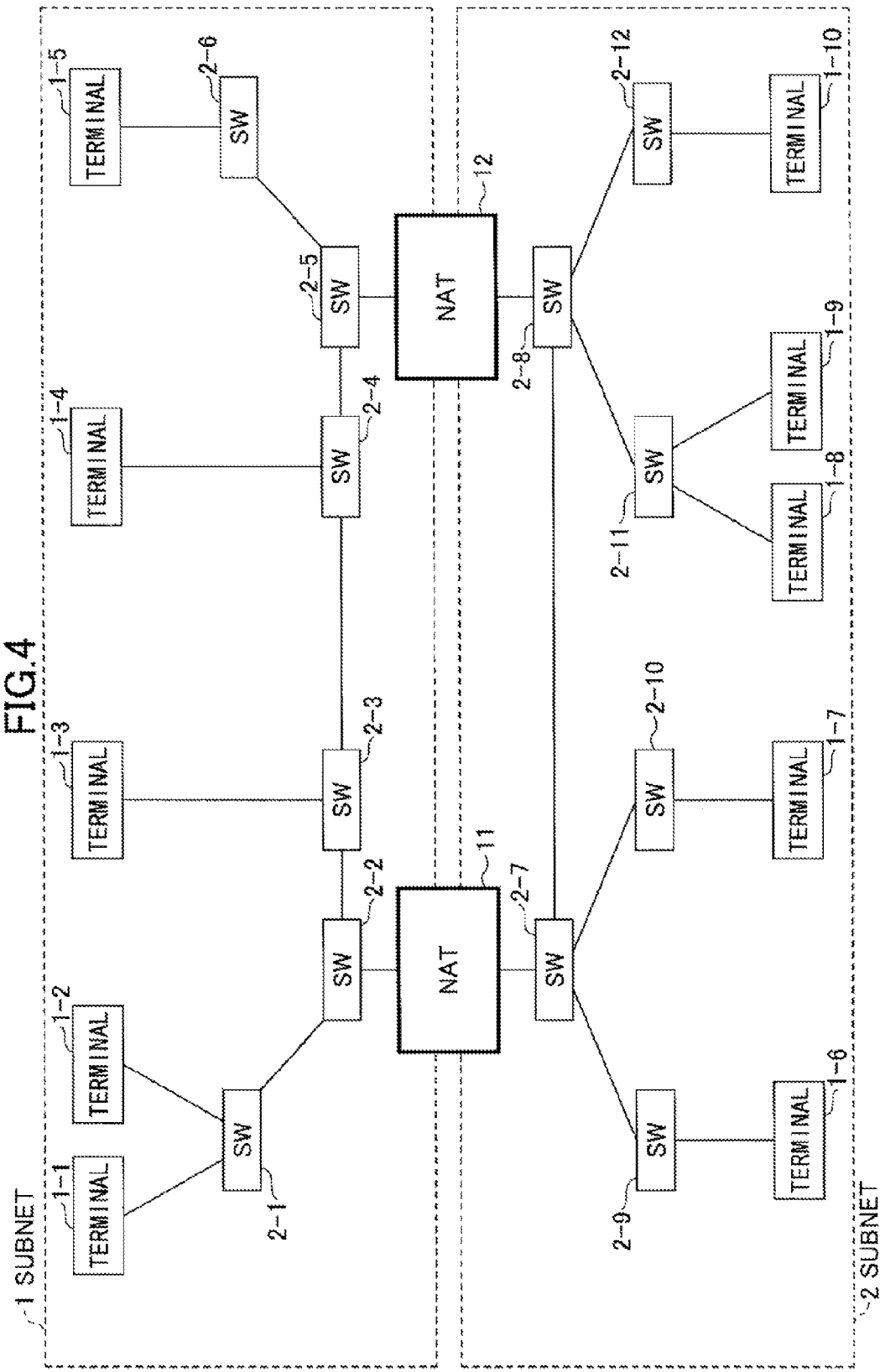

FIG.5

| TERMINAL NAME | ASSIGNED IP ADDRESS |
|---|---|
| TERMINAL 1-1 | 192.168.1.1 |
| TERMINAL 1-2 | 192.168.1.2 |
| TERMINAL 1-3 | 192.168.1.3 |
| TERMINAL 1-4 | 192.168.1.4 |
| TERMINAL 1-5 | 192.168.1.5 |
| TERMINAL 1-6 | 192.168.100.1 |
| TERMINAL 1-7 | 192.168.100.2 |
| TERMINAL 1-8 | 192.168.100.3 |
| TERMINAL 1-9 | 192.168.100.4 |
| TERMINAL 1-10 | 192.168.100.5 |

FIG.6

| PSEUDO IP ADDRESS | TERMINAL IP ADDRESS |
|---|---|
| 192.168.1.11 | 192.168.100.1 (TERMINAL 1-6) |
| 192.168.1.12 | 192.168.100.2 (TERMINAL 1-7) |
| 192.168.1.13 | 192.168.100.3 (TERMINAL 1-8) |
| 192.168.1.14 | 192.168.100.4 (TERMINAL 1-9) |
| 192.168.1.15 | 192.168.100.5 (TERMINAL 1-10) |
| 192.168.100.11 | 192.168.1.1 (TERMINAL 1-1) |
| 192.168.100.12 | 192.168.1.2 (TERMINAL 1-2) |
| 192.168.100.13 | 192.168.1.3 (TERMINAL 1-3) |
| 192.168.100.14 | 192.168.1.4 (TERMINAL 1-4) |
| 192.168.100.15 | 192.168.1.5 (TERMINAL 1-5) |

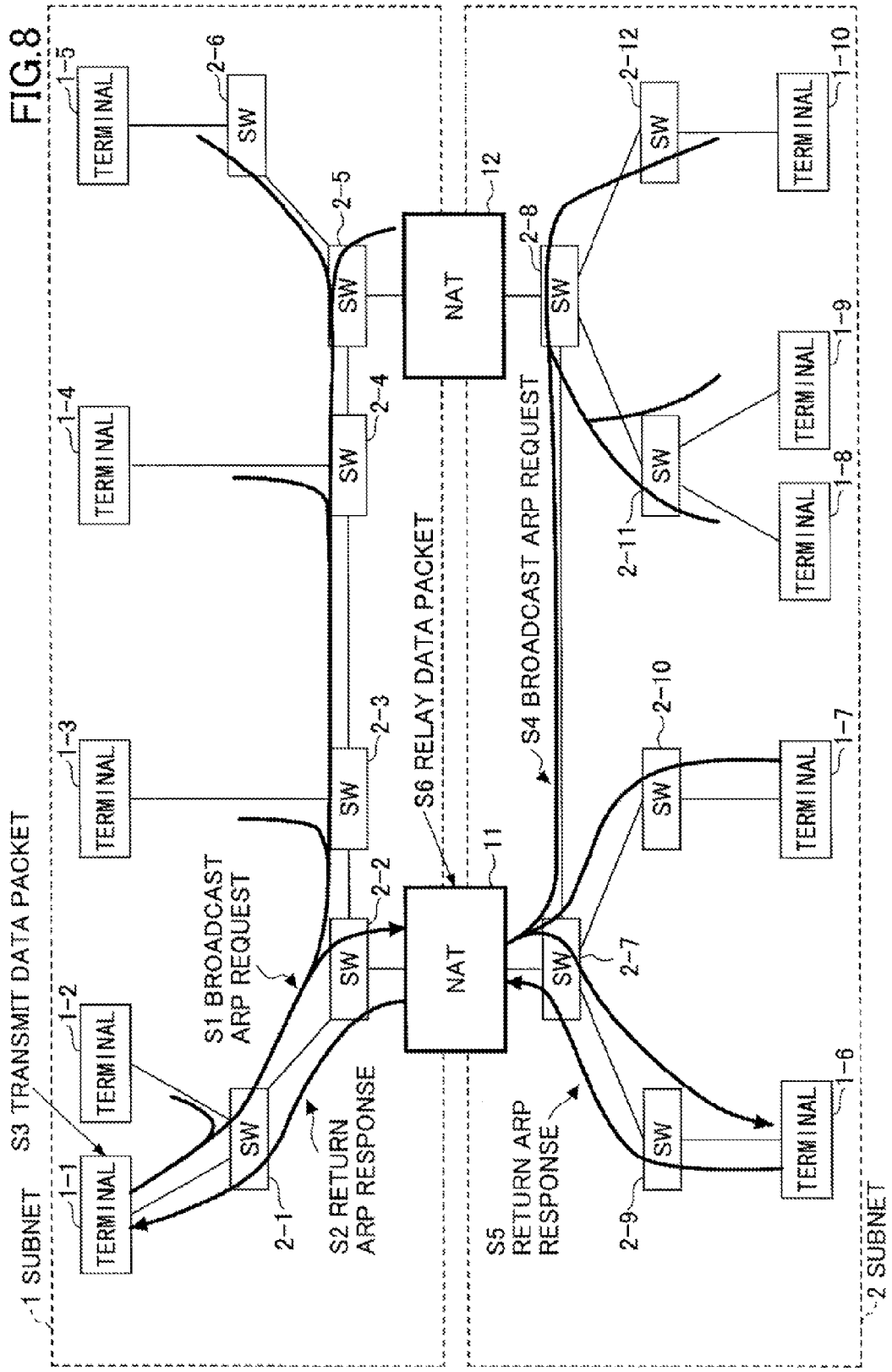

FIG.9A

| +00 | | +01 |
|---|---|---|
| DESTINATION ADDRESS (MAC ADDRESS) | | |
| SOURCE ADDRESS (MAC ADDRESS) | | |
| TYPE | | |
| HARDWARE TYPE | | |
| PROTOCOL TYPE | | |
| HARDWARE SIZE | PROTOCOL SIZE | |
| OPERATION | | |
| SOURCE MAC ADDRESS 6 BYTES | | |
| SOURCE IP ADDRESS 4 BYTES | | |
| DESTINATION MAC ADDRESS 6 BYTES | | |
| DESTINATION IP ADDRESS 4 BYTES | | |

{ ETHERNET HEADER PART }

FIG.9B

| +00 | +01 |
|---|---|
| BROADCAST (FF-FF-FF-FF-FF-FF) | |
| SOURCE MAC ADDRESS | |
| 08H | 06H |
| 00H | 01H |
| 08H | 00H |
| 06H | 04H |
| 00H | 01H |
| SOURCE MAC ADDRESS | |
| SOURCE IP ADDRESS | |
| ALL 00H | |
| DESTINATION IP ADDRESS | |

FIG.9C

| +00 | +01 |
|---|---|
| SOURCE MAC ADDRESS | |
| RECEIVER-SIDE MAC ADDRESS (DESTINATION MAC ADDRESS) | |
| 08H | 06H |
| 00H | 01H |
| 08H | 00H |
| 06H | 04H |
| 00H | 02H |
| RECEIVER-SIDE MAC ADDRESS (DESTINATION MAC ADDRESS) | |
| RECEIVER-SIDE IP ADDRESS (DESTINATION IP ADDRESS) | |
| SOURCE MAC ADDRESS | |
| SOURCE IP ADDRESS | |

FIG.10A

| PSEUDO IP ADDRESS | TERMINAL IP ADDRESS | RESPONSE FLAG |
|---|---|---|
| 192.168.1.11 | 192.168.100.1 (TERMINAL 1-6) | 1 |
| 192.168.1.12 | 192.168.100.2 (TERMINAL 1-7) | |
| 192.168.1.13 | 192.168.100.3 (TERMINAL 1-8) | |
| 192.168.1.14 | 192.168.100.4 (TERMINAL 1-9) | |
| ~~192.168.1.15~~ | ~~192.168.100.5 (TERMINAL 1-10)~~ | |
| 192.168.100.11 | 192.168.1.1 (TERMINAL 1-1) | |
| 192.168.100.12 | 192.168.1.2 (TERMINAL 1-2) | |
| 192.168.100.13 | 192.168.1.3 (TERMINAL 1-3) | |
| 192.168.100.14 | 192.168.1.4 (TERMINAL 1-4) | |
| 192.168.100.15 | 192.168.1.5 (TERMINAL 1-5) | |

FIG.10B

| PSEUDO IP ADDRESS | TERMINAL IP ADDRESS | RESPONSE FLAG |
|---|---|---|
| ~~192.168.1.11~~ | ~~192.168.100.1 (TERMINAL 1-6)~~ | |
| 192.168.1.12 | 192.168.100.2 (TERMINAL 1-7) | |
| 192.168.1.13 | 192.168.100.3 (TERMINAL 1-8) | |
| 192.168.1.14 | 192.168.100.4 (TERMINAL 1-9) | |
| 192.168.1.15 | 192.168.100.5 (TERMINAL 1-10) | 1 |
| 192.168.100.11 | 192.168.1.1 (TERMINAL 1-1) | |
| 192.168.100.12 | 192.168.1.2 (TERMINAL 1-2) | |
| 192.168.100.13 | 192.168.1.3 (TERMINAL 1-3) | |
| 192.168.100.14 | 192.168.1.4 (TERMINAL 1-4) | |
| 192.168.100.15 | 192.168.1.5 (TERMINAL 1-5) | |

FIG.10C

| SOURCE IP ADDRESS<br>= SOURCE IP ADDRESS OF RECEIVED PACKET | PSEUDO IP ADDRESS<br>= SOURCE IP ADDRESS OF TRANSMISSION PACKET |
|---|---|
| 192.168.1.1 (TERMINAL 1-1) | 192.168.100.11 |
| 192.168.1.2 (TERMINAL 1-2) | 192.168.100.12 |
| 192.168.1.3 (TERMINAL 1-3) | 192.168.100.13 |
| 192.168.1.4 (TERMINAL 1-4) | 192.168.100.14 |
| 192.168.1.5 (TERMINAL 1-5) | 192.168.100.15 |
| 192.168.100.1 (TERMINAL 1-6) | 192.168.1.11 |
| 192.168.100.2 (TERMINAL 1-7) | 192.168.1.12 |
| 192.168.100.3 (TERMINAL 1-8) | 192.168.1.13 |
| 192.168.100.4 (TERMINAL 1-9) | 192.168.1.14 |
| 192.168.100.5 (TERMINAL 1-10) | 192.168.1.15 |

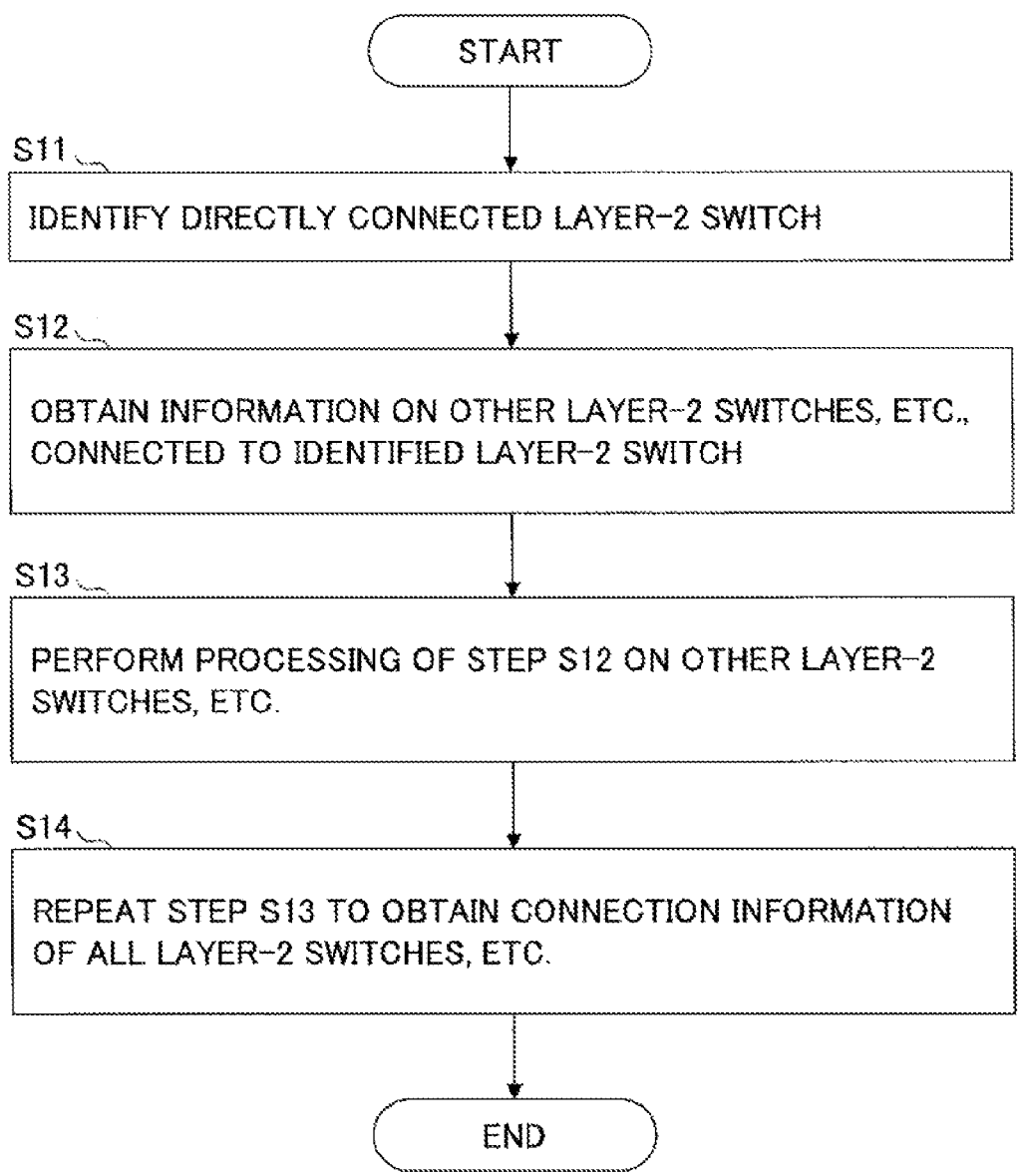

FIG.15

| PSEUDO IP ADDRESS | TERMINAL IP ADDRESS |
|---|---|
| 192.168.1.11 | 192.168.100.1 (TERMINAL 1-6) |
| 192.168.1.12 | 192.168.100.2 (TERMINAL 1-7) |
| 192.168.1.13 | 192.168.100.3 (TERMINAL 1-8) |
| 192.168.1.14 | 192.168.100.4 (TERMINAL 1-9) |
| 192.168.1.15 | 192.168.100.5 (TERMINAL 1-10) |
| 192.168.100.11 | 192.168.1.1 (TERMINAL 1-1) |
| 192.168.100.12 | 192.168.1.2 (TERMINAL 1-2) |
| 192.168.100.13 | 192.168.1.3 (TERMINAL 1-3) |
| 192.168.100.14 | 192.168.1.4 (TERMINAL 1-4) |
| 192.168.100.15 | 192.168.1.5 (TERMINAL 1-5) |

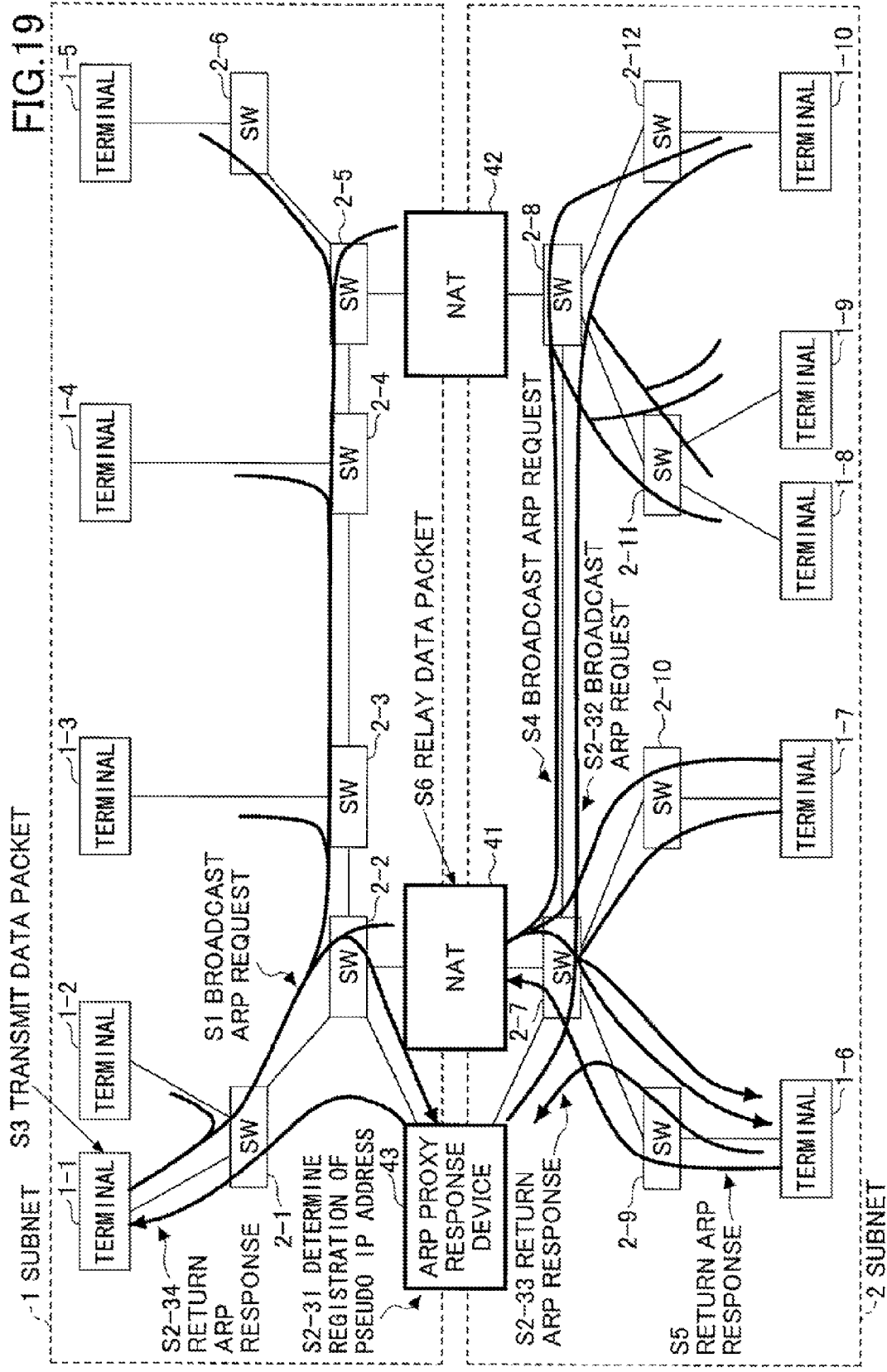

ADDRESS TRANSLATION METHOD, ADDRESS TRANSLATION PROXY RESPONSE METHOD, ADDRESS TRANSLATION DEVICE, AND ADDRESS TRANSLATION PROXY RESPONSE DEVICE

CROSS-REFERENCE TO RELATED APPLICATION

This application is based upon and claims the benefit of priority of the prior Japanese Patent Application No. 2011-012367, filed on Jan. 24, 2011, the entire contents of which are incorporated herein by reference.

FIELD

A certain aspect of the embodiments discussed herein is related to an address translation method, an address translation proxy response method, an address translation device, and an address translation proxy response device in connecting to two networks having address spaces independent of each other.

BACKGROUND

FIG. 1 is a diagram illustrating a network configuration where multiple networks are connected. In FIG. 1, a subnet 1 includes terminals 1-1, 1-2, 1-3, 1-4, and 1-5 and Layer-2 switches (SWs) 2-1, 2-2, 2-3, 2-4, 2-5, and 2-6. Further, a subnet 2 includes terminals 1-6, 1-7, 1-8, 1-9, and 1-10 and Layer-2 switches (SWs) 2-7, 2-8, 2-9, 2-10, 2-11, and 2-12.

The subnet 1 and the subnet 2 are networks having IP address spaces independent of each other. The subnet 1 and the subnet 2 are connected by a network address translator (NAT) 3. The NAT 3 retains an address translation table in order to connect communications between a group of terminals in the subnet 1 and a group of terminals in the subnet 2. For example, the NAT 3 retains a pseudo IP address for the terminal 1-6. The pseudo IP address of the terminal 1-6 is defined in the IP address space of the subnet 1, to which the NAT 3 belongs.

It is assumed that the subnet 1 has a network address of 192.168.1.0/24, the subnet 2 has a network address of 192.168.100.0/24, the terminal 1-1 has an IP address of 192.168.1.1, and the terminal 1-6 has an IP address of 192.168.100.1. The NAT 3 has an address translation table in which a pseudo IP address of 192.168.100.11 for the terminal 1-1 and a pseudo IP address of 192.168.1.11 for the terminal 1-6 are recorded. When the terminal 1-1 transmits a packet to the terminal 1-6, the terminal 1-1 transmits the packet to the pseudo IP address of the terminal 1-6, 192.168.1.11, and the NAT 3 temporarily receives the packet. Then, the NAT 3 converts the destination IP address to 192.168.100.1 and converts the source IP address to 192.168.100.11, and thereafter transmits the received packet to the terminal 1-6.

In the case of connecting two networks by a single NAT as illustrated in FIG. 1, there is a problem in that an increase in traffic to be relayed causes an increase in a relaying load on the NAT. Therefore, the technique of connecting networks by multiple NATs as illustrated in FIG. 2 is provided.

In FIG. 2, the subnet 1 and the subnet 2 are connected by the NAT 3 and a NAT 4. In this case, the NAT 3 has an address translation table illustrated in FIG. 3A and the NAT 4 has an address translation table illustrated in FIG. 3B, so that packets addressed to the terminals 1-1, 1-2, 1-6, 1-7, and 1-8 are forwarded by the NAT 3, and packets addressed to the terminals 1-3, 1-4, 1-5, 1-9, and 1-10 are forwarded by the NAT 4. FIG. 3C illustrates a source address translation table in the NAT 3 and the NAT 4.

The technique is known of dividing an address range between multiple address management devices provided in a single network and causing the address management devices to be in charge of managing respective address ranges different from each other. (See, for example, Japanese Laid-open Patent Publication No. 8-186569.)

Further, the technique is known of connecting networks having different network addresses by a relay and causing the relay to respond by proxy to an ARP (Address Resolution Protocol) request from one to the other of the networks. (See, for example, Japanese Laid-open Patent Publication No. 2005-33302.)

Further, the technique is known of providing an active and a backup (standby) inter-LAN connection device on the same route. (See, for example, Japanese Laid-open Patent Publication No. 8-256173.)

SUMMARY

According to an aspect of the invention, an address translation device includes an address translation part containing information on correspondence between pseudo addresses and real addresses of a first network and a second network having respective address spaces independent of each other, the first network and the second network being connected by a plurality of address translation devices including the address translation device; an address translation request reception part configured to receive an address translation request with respect to a pseudo IP address contained in the address translation part; an address resolution response determination part configured to determine whether to respond to the address translation request in accordance with a predetermined rule based on a source address of the received address translation request; and a response part configured to respond to the address translation request based on a determination by the address resolution response determination part.

According to an aspect of the invention, an address translation proxy response device configured to respond to an address translation request in place of a plurality of address translation devices connecting a first network and a second network having address spaces independent of each other, the address translation devices each including an address translation part containing information on correspondence between pseudo addresses and real addresses of the first network and the second network, includes a pseudo address storage part configured to store the pseudo IP addresses contained in the address translation parts of the address translation devices; an address translation request reception part configured to receive the address translation request with respect to a pseudo IP address contained in the address translation parts of the address translation devices; an address resolution response determination part configured to determine one of the address translation devices to respond to the address translation request in accordance with a predetermined rule based on a source address of the received address translation request; and a response part configured to respond to the address translation request by storing an address of the one of the address translation devices determined by the address resolution response determination part in a response to the address translation request.

According to an aspect of the invention, an address translation method includes receiving an address translation request with respect to a pseudo IP address contained in an address translation part of an address translation device, the address translation part containing information on correspondence between pseudo addresses and real addresses of a first network and a second network having respective address spaces independent of each other, the first network and the second network being connected by a plurality of address translation devices including said address translation device; determining whether to respond to the address translation request in accordance with a predetermined rule based on a source address of the received address translation request; and responding to the address translation request based on a determination by said determining.

According to an aspect of the invention, an address translation proxy response method for responding to an address translation request in place of a plurality of address translation devices connecting a first network and a second network having address spaces independent of each other, the address translation devices each including an address translation part containing information on correspondence between pseudo addresses and real addresses of the first network and the second network, includes storing the pseudo IP addresses contained in the address translation parts of the address translation devices; receiving the address translation request with respect to a pseudo IP address contained in the address translation parts of the address translation devices; determining one of the address translation devices to respond to the address translation request in accordance with a predetermined rule based on a source address of the received address translation request; and responding to the address translation request by storing an address of the one of the address translation devices determined by the address resolution response determination part in a response to the address translation request.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

FIG. 1 is a diagram illustrating a network configuration where multiple networks are connected;

FIG. 2 is a diagram illustrating another network configuration where multiple networks are connected;

FIGS. 3A through 3C are diagrams illustrating address translation tables;

FIG. 4 is a diagram illustrating a network configuration in which multiple networks are connected according to a first embodiment;

FIG. 5 is a diagram illustrating assignment of the IP addresses of terminals according to the first embodiment;

FIG. 6 is a diagram illustrating an address translation table according to the first embodiment;

FIG. 8 is a diagram for illustrating a packet forwarding operation according to the first embodiment;

FIGS. 9A, 9B, and 9C are diagrams illustrating a basic format, an ARP request format, and an ARP response format, respectively, of a packet.

FIGS. 10A through 10C are diagrams illustrating address translation tables according to the first embodiment;

FIG. 11 is a flowchart illustrating a process for recognizing network topology by NATs according to a second embodiment;

FIG. 15 is a diagram illustrating an address translation table according to the third embodiment;

FIG. 19 is a diagram illustrating a packet forwarding operation according to the fourth embodiment.

DESCRIPTION OF EMBODIMENTS

Figure 7:
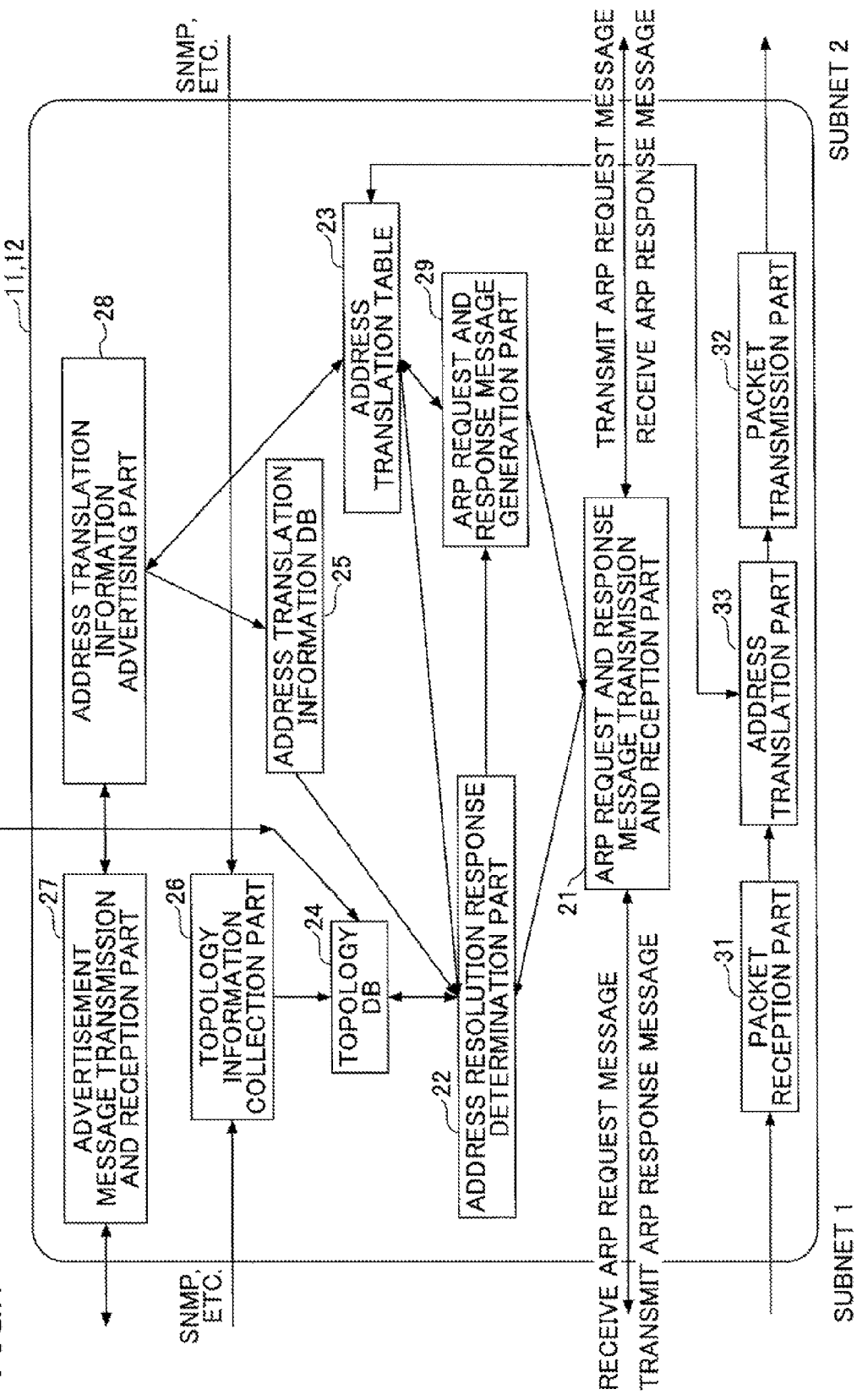
FIG. 7 is a diagram illustrating an address translation device according to the first embodiment.

As described above, FIG. 2 illustrates the subnet 1 and the subnet 2 connected by the NAT 3 and the NAT 4.

However, according to the technique illustrated in FIG. 2, there is a problem in that it is necessary to manage entries without an overlap between the NATs 3 and 4 and it takes time and effort to correct table settings if there is a change in the table settings because of a change in the number of terminals. Further, there is also a problem in that if an operational load concentrates on a specific server, traffic concentrates on a NAT in which the pseudo IP address of the heavily-loaded server is recorded.

Furthermore, since data pass through a NAT in which an address translation table is recorded, the data may be forwarded in a roundabout route depending on the recording condition of entries or the position of terminals that perform communications. For example, in the case of performing communications between the terminal 1-2 and the terminal 1-6 and between the terminal 1-5 and the terminal 1-10 as illustrated in FIG. 2, it is possible to forward data in the shortest route.

However, in the case of performing communications between the terminal 1-1 and the terminal 1-10 in FIG. 2, communications are performed via the NAT 4, so that data are routed from the terminal 1-1 to the Layer-2 switches 2-1, 2-2, 2-3, 2-4, and 2-5 to the NAT 4 to the Layer-2 switches 2-8 and 2-12 to the terminal 1-10. Thus, there is a problem in that compared with the case of performing communications via the NAT 3, the number of hops increases and data are forwarded in a roundabout route to cause more delay and unnecessary traffic.

According to an aspect of the invention, it is possible to perform load distribution with efficiency.

According to an aspect of the invention, an address translation device is provided that performs load distribution with efficiency.

Preferred embodiments of the present invention will be explained with reference to accompanying drawings.

In the following, the same elements as those described above are referred to by the same reference numerals.

[a] First Embodiment

FIG. 4 is a diagram illustrating a network configuration in which multiple networks are connected according to a first embodiment. In FIG. 4, the subnet 1 includes the terminals 1-1 through 1-5 and the Layer-2 switches 2-1 through 2-6. The subnet 2 includes the terminals 1-6 through 1-10 and the Layer-2 switches 2-7 through 2-12.

The subnet 1 and the subnet 2 are networks having IP address spaces independent of each other. The subnet 1 and the subnet 2 are connected by a NAT 11 and a NAT 12. The NAT 11 is connected to the Layer-2 switches 2-2 and 2-7, and the NAT 12 is connected to the Layer-2 switches 2-5 and 2-8.

The NAT 11 and the NAT 12 retain an address translation table in order to connect communications between a group of terminals in the subnet 1 and a group of terminals in the subnet 2. For example, the NAT 11 and the NAT 12 retain a pseudo IP address for the terminal 1-6. The pseudo IP address of the terminal 1-6 is defined in the IP address space of the subnet 1, to which the NAT 11 and the NAT 12 belong. The subnet 1 and the subnet 2 may be connected by three or more NATs.

Here, it is assumed that a network address of 192.168.1.0/24 is defined for the subnet 1, and a network address of 192.168.100.0/24 is defined for the subnet 2. Further, the terminals 1-1 through 1-10 are assigned respective IP addresses as illustrated in FIG. 5. In this case, each of the NAT 11 and the NAT 12 has an address translation table for destination and source address conversion (translation) illustrated in FIG. 6, where the terminal IP addresses are correlated with corresponding pseudo IP addresses.

Next, a description is given of a configuration of an address translation device according to this embodiment.

FIG. 7 is a diagram illustrating an address translation device corresponding to the NATs 11 and 12. Referring to FIG. 7, the address translation device includes an ARP request and response message transmission and reception part 21, an address resolution response determination part 22, an address translation table 23, a topology database (topology DB) 24, and an address translation information database (address translation information database DB) 25.

The ARP request and response message transmission and reception part 21 is configured to receive an ARP request message from the subnet 1 and to transmit an ARP response message to the subnet 1. Further, the ARP request and response message transmission and reception part 21 is configured to transmit an ARP request message to the subnet 2 and to receive an ARP response message from the subnet 2.

The address resolution response determination part 22 is configured to determine whether to process the ARP request message received from the subnet 1. At this point, the address resolution response determination part 22 determines that the received ARP request message be processed if any of the conditions is satisfied in the following rules. In determining the following conditions, the address resolution response determination part 22 refers to the address translation table 23, the topology database 24, and the address translation information database 25.

First, the address resolution response determination part 22 determines that the APR request message be processed if the ARP request message contains a pseudo IP address recorded in the address translation table 23 as a target IP address (destination IP address).

Second, the address resolution response determination part 22 determines whether to process the APR request message based on a result such as a hash value obtained using a hashing function that takes as input the source (sender) MAC address of the APR request message.

Third, the address resolution response determination part 22 determines that the APR request message be processed if the distance between a source (sender) terminal of the ARP request message and the address translation device is the shortest.

Fourth, the address resolution response determination part 22 determines that the APR request message be processed if the address translation device is located on the shortest distance (route) between a source terminal of the ARP request message and a terminal (destination terminal) corresponding to the pseudo IP address indicated as the target IP address (destination IP address).

The address translation device further includes a topology collection part 26, an advertisement message transmission and reception part 27, an address translation information advertising part 28, an ARP request and response message generation part 29, a packet reception part 31, a packet transmission part 32, and an address translation part 33.

The topology collection part 26 is configured to collect topology information from a Layer-2 switch connected to the address translation device by SNMP (Simple Network Management Protocol), the topology information containing the positions of terminals of a network connected to the address translation device and the position (point) of the connection of another address translation device to the network.

The advertisement message transmission and reception part 27 is configured to advertise (transmit) a keepalive message containing the address of the address translation device and an address list notification message containing a list of the address of the address translation device and the pseudo IP addresses recorded in the address translation device to the subnet 1, and to receive a keepalive message and an address list notification message from the subnet 1. Further, the advertisement message transmission and reception part 27 is configured to advertise an address translation information advertisement message containing the retained address translation table 23 to the subnet 1, and to receive an address translation information advertisement message from the subnet 1.

The address translation information advertising part 28 is configured to generate an address translation information advertisement message containing the entries of the address translation table 23, referring to the address translation table 23. Further, the address translation information advertising part 28 is configured to register the address translation information advertisement message received from the subnet 1 with the address translation information database 25.

The address translation information database 25 is configured to store the keepalive information of another address translation device recognized by the reception of its keepalive message. Further, the address translation information database 25 is configured to store other address translation information recognized by the reception of an address translation information advertisement message.

Information that correlates the destination IP address (=pseudo IP address) of a received data packet with a corresponding real IP address and information that correlates the source IP address (that is, real IP address) of a received data packet with a corresponding pseudo IP address are recorded in the address translation table 23.

The APR request and response message generation part 29 is configured to create an ARP response message having the MAC address of the address translation device as a target MAC address in response to the address resolution response determination part 22 determining that the received ARP request message be processed. Further, the APR request and response message generation part 29 is configured to retrieve a real IP address corresponding to the target IP address (destination IP address) of the received ARP request message using the address translation table 23 and create an address translation request message (addressed) to the real IP address, if the address resolution response determination part 22 requires the MAC address of a destination terminal. The ARP request and response message generation part 29 is configured to provide the ARP response message with the returned (obtained) MAC address.

The packet reception part 31 is configured to receive a packet from the subnet 1. The packet transmission part 32 is configured to transmit a packet to the subnet 2. The address translation part 33 is configured to translate the destination IP address of a received data packet to a real IP address using the information of the address translation table 23 and to forward the data packet to the packet transmission part 32.

The above-described functions are for performing address translation in forwarding a packet from the subnet 1 to the subnet 2. In the case of bidirectional forwarding that also includes forwarding a packet from the subnet 2 to the subnet 1, functions in the reverse direction, which are omitted in FIG. 7, are implemented.

A description is given of a packet forwarding operation between the subnets 1 and 2.

A description is given, with reference to FIG. 8, of an operation of forwarding a packet from the terminal 1-1 of the subnet 1 to the terminal 1-6 of the subnet 2. In the following description, parenthesized step numbers correspond to those in FIG. 8.

In step S1, the terminal 1-1 broadcasts an ARP request message (ARP request) to the pseudo IP address of the terminal 1-6 in the subnet 1.

In step S2, in response to receiving the ARP request, the NAT 11 and the NAT 12 check their respective address translation tables 23 for a pseudo IP address corresponding to the destination IP address of the ARP request, and determine that the corresponding pseudo IP address is registered (recorded). Then, the NAT 11 and the NAT 12 determine a hash value using a hashing function that takes as input the source MAC address of the ARP request, and determine based on the hash value whether to respond to or ignore the ARP request.

As a simple example, since the networks are connected by two NATs in this embodiment, the source MAC address is divided by two, and the remainder is determined. It may be determined that the NAT 11 respond to the ARP request if the value of the remainder is zero and that the NAT 12 respond to the ARP request if the value of the remainder is one. Further, it may also be determined that the NAT 11 respond to the ARP request if the value of the source MAC address is greater than or equal to a threshold and that the NAT 12 respond to the ARP request if the value of the source MAC address is smaller than the threshold. Furthermore, the NAT 11 or the NAT 12 may be preset in a MAC address list, and the NAT to respond to the ARP request may be determined referring to the list using the source MAC address.

The NAT to respond to the ARP request returns an address resolution response message (ARP response) containing the MAC address of the NAT as a MAC address corresponding to the target IP address (the pseudo IP address of the terminal 1-6). In this embodiment, the NAT 11 is selected (as a NAT to respond to the ARP request) based on the hash value, and the NAT 11 stores the MAC address assigned to its interface on the subnet 1 side in an ARP response and transmits the ARP response.

In step S3, in response to receiving the ARP response, the terminal 1-1 generates a data packet having the pseudo IP address of the terminal 1-6 as a destination IP address, the MAC address of the NAT 11 as a destination MAC address, the IP address of the terminal 1-1 as a source IP address, and the MAC address of the terminal 1-1 as a source MAC address, and forwards the generated data packet to the NAT 11.

In step S4, the NAT 11 receives the data packet having its MAC address as a destination MAC address. The NAT 11 searches the address translation table 23 using the destination IP address of the received packet as an input key, and identifies a corresponding terminal real IP address. Then, the NAT 11 broadcasts an ARP request (addressed) to the real IP address of the terminal 1-6 in the subnet 2.

In step S5, the terminal 1-6 receives the ARP request for its MAC address, and returns an ARP response containing the MAC address of the terminal 1-6.

In step S6, in response to receiving the ARP response, the NAT 11 updates the IP header of the previously received data packet (in Step S4) in the following manner. That is, the destination IP address is changed to the real IP address of the terminal 1-6, the destination MAC address is changed to the MAC address of the terminal 1-6, the source IP address is changed to the pseudo IP address of the terminal 1-1 obtained by searching the address translation table 23, and the source MAC address is changed to the MAC address assigned to the interface of the NAT 11 on the subnet 2 side. Then, the NAT 11 transmits the data packet with the updated IP header to the terminal 1-6.

Figure 9D:
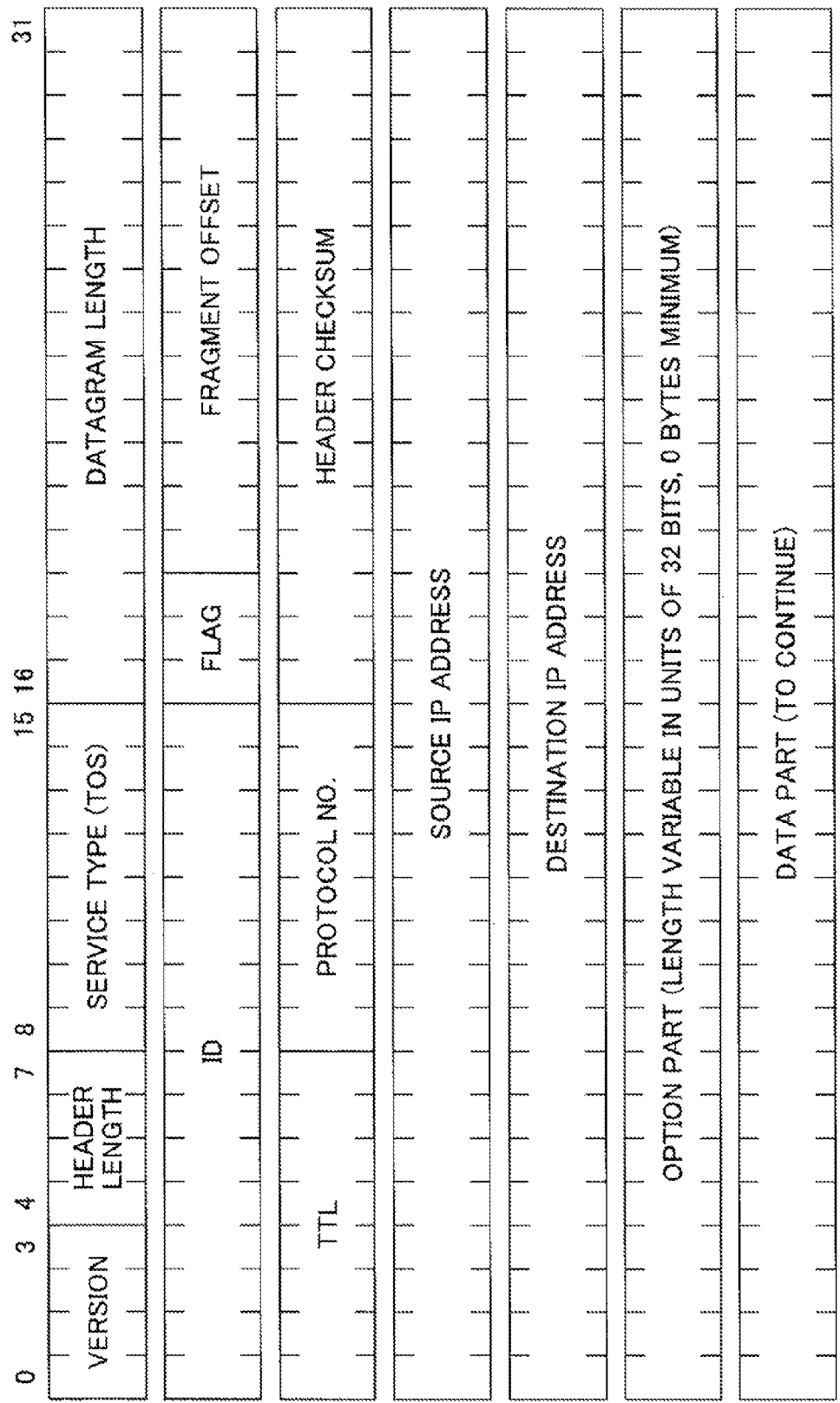
FIG. 9D is a diagram illustrating data stored following the Ethernet (registered trademark) header part of the packet according to the first embodiment.

Here, FIGS. 9A, 9B, and 9C illustrate a basic format, an ARP request format, and an ARP response format, respectively, of a packet. In a data packet, the type of the Ethernet (registered trademark) header part of the basic format illustrated in FIG. 9A is 0x0800 (where 0x indicates hexadecimal notation), and data of the format illustrated in FIG. 9D are stored following the Ethernet (registered trademark) header part. In FIGS. 9B and 9C, "H" of, for example, "00H" indicates hexadecimal notation.

In the above description, a hashing function is used based on the assumption that two networks are connected by two NATs. In this case, in recording the same address translation table 23 in the two NATs, it may be recorded in the address translation information database 25 as other address translation information that the networks are connected by the two NATs. However, automatic finding of an active NAT makes it possible to simplify settings and respond to NAT failure.

For example, each NAT periodically transmits a keepalive packet containing its own ID to networks to which the NAT is connected (the subnets 1 and 2 in this embodiment). The presence of a NAT is determined in response to receiving keepalive packets of the same ID from the two connected networks. By counting the number of pairs of keepalive packets of the same ID, it is possible to recognize (determine) the number of NATs that connect the two networks. It is possible to execute a method of determining whether to receive an ARP response based on the number of detected NATs and a hash value.

Further, it is possible to control whether to distribute traffic that passes through NATs by causing the NATs to notify each other of the pseudo IP addresses of their respective address translation tables 23.

The address translation table 23 of each of the NAT 11 and the NAT 12 may include a destination address translation table as illustrated in FIG. 10A or FIG. 10B and a source address translation table as illustrated in FIG. 10C.

For example, it is assumed that the NAT 11 does not retain the pseudo (destination) IP address of the terminal 1-10 in its address translation table 23 as illustrated in FIG. 10A and the NAT 12 does not retain the pseudo (destination) IP address of the terminal 1-6 in its address translation table 23 as illustrated in FIG. 10B. In FIGS. 10A and 10B, strikethrough indicates that the address is not recorded. Then, the NAT 11 broadcasts the pseudo IP addresses of the terminals 1-6 through 1-9 and the NAT 12 broadcasts the pseudo IP addresses of the terminals 1-7 through 1-10 to the subnet 1. Further, the NAT 11 and the NAT 12 broadcast the terminals 1-1 through 1-5 to the subnet 2. It is possible to cause the NAT 11 to determine whether to respond to an ARP request using a hashing function only with respect to ARP requests to the terminals 1-7 through 1-9, whose address translation information is shared with the NAT 12, and to always respond to an ARP request to the terminal 1-6. A response flag "1" in FIG. 10A indicates that a response is always made to an ARP request.

Likewise, it is possible to cause the NAT 12 to determine whether to respond to an ARP request using a hashing function only with respect to ARP requests to the terminals 1-7 through 1-9, whose address translation information is shared with the NAT 11, and to always respond to an ARP request to the terminal 1-10. A response flag "1" in FIG. 10B indicates that a response is always made to an ARP request.

[b] Second Embodiment

A description is given of a second embodiment. It is possible to determine the positions of terminals in a network such as an Ethernet (registered trademark) network by determining the topology of the network, using protocols such as LLDP (Link Layer Discovery Protocol) and SNMP. It is possible to forward data in the shortest route by determining whether to respond to an ARP request using such information.

In the case where each NAT determines the topology information of the subnet 1, containing the positions of terminals in the subnet 1 and the position of the connection of another NAT to the subnet 1, using LLDP and SNMP, it is possible for each NAT to calculate the distance between a source terminal of an ARP request and each NAT from the source MAC address of the received ARP request. Therefore, an ARP response may be returned if (it is determined that) the distance between the NAT and the source terminal of the ARP request is the shortest. For example, the number of hops may be employed as the distance. In addition, an actual distance or a delay time may also be employed as the distance.

For example, in the case of the topology illustrated in FIG. 4, the NAT 11 returns an ARP response when receiving an ARP request from the terminal 1-1, 1-2, or 1-3. The NAT 12 returns an ARP response when receiving an ARP request from the terminal 1-4 or 1-5.

Further, in the case where each of NATs has obtained the topology information of the subnets 1 and 2 connected by the NATs using LLDP and SNMP, the topology information containing the positions of the terminals of the subnets 1 and 2 and the positions of the connections of the other NATs to the subnets 1 and 2, it is possible for each NAT to calculate the shortest route from a source terminal of an ARP request to a destination terminal based on the source MAC address and the destination IP address of the received ARP request. The NAT returns an ARP response if the NAT is on the shortest route.

It is also assumed that the topology is as illustrated in FIG. 4. In the case where the terminal 1-1 broadcasts an ARP request (addressed) to the pseudo IP address of the terminal 1-10, the ARP request is received by the NAT 11 and the NAT 12. Each of the NAT 11 and the NAT 12 calculates (determines) the shortest route from the source MAC address and the target IP address, which is subjected to address resolution. For example, the shortest route may be a route having the smallest number of hops. LLDP makes it possible to obtain the MAC address of a terminal connected to a Layer-2 switch. Further, an optional function of LLDP makes it possible to obtain the IP address of the terminal as well. If the IP address has not been obtained, each of the NAT 11 and the NAT 12 obtains the MAC address by broadcasting an ARP request to the target IP address (subjected to address resolution) to the subnet 2. Then, each of the NAT 11 and the NAT 12 calculates the shortest route using the source MAC address and the destination MAC address. Either NAT (that is, the NAT 11 or the NAT 12) on the calculated (shortest) route returns an ARP response. In this case, the shortest route is from the terminal 1-1 to the Layer-2 switches 2-1 and 2-2 to the NAT 11 to the Layer-2 switches 2-7, 2-8, and 2-12 to the terminal 1-10. Therefore, the NAT 11 returns an ARP response.

It is possible to calculate (determine) the shortest route from a source terminal to a NAT in the case of collecting the topology information of one of the subnets 1 and 2, and to calculate (determine) the shortest route from a source terminal to a destination terminal in the case of collecting the topology information of each of the subnets 1 and 2. As a result, it is possible to forward a packet with reduced delay and to prevent generation of unnecessary traffic.

In this embodiment, it is assumed that network topology is recognized with protocols such as LLDP and SNMP. Alternatively, the topology may be input to each NAT by manual recording or with a network management server (not graphically illustrated).

Here, a description is given in detail below, with reference to FIG. 11, of a process for recognizing (obtaining) network topology by the NATs 11 and 12.

First, in step S11, the NAT identifies a Layer-2 switch directly connected to the NAT using LLDP.

In step S12, with respect to the Layer-2 switch identified using LLDP, the NAT obtains information on other Layer-2 switches, terminals, and/or NATs connected to the Layer-2 switch using SNMP. The (identified) Layer-2 switch has identified information on other Layer-2 switches, terminals, and/or NATs connected to the Layer-2 switch in advance using LLDP.

In step S13, the NAT executes the same process as in step S12 on the other Layer-2 switches obtained in step S12.

In step S14, the NAT repeats step S13 to obtain information on the connections of all Layer-2 switches, terminals, and/or NATs connected in or to the subnets 1 and 2.

Figure 12:
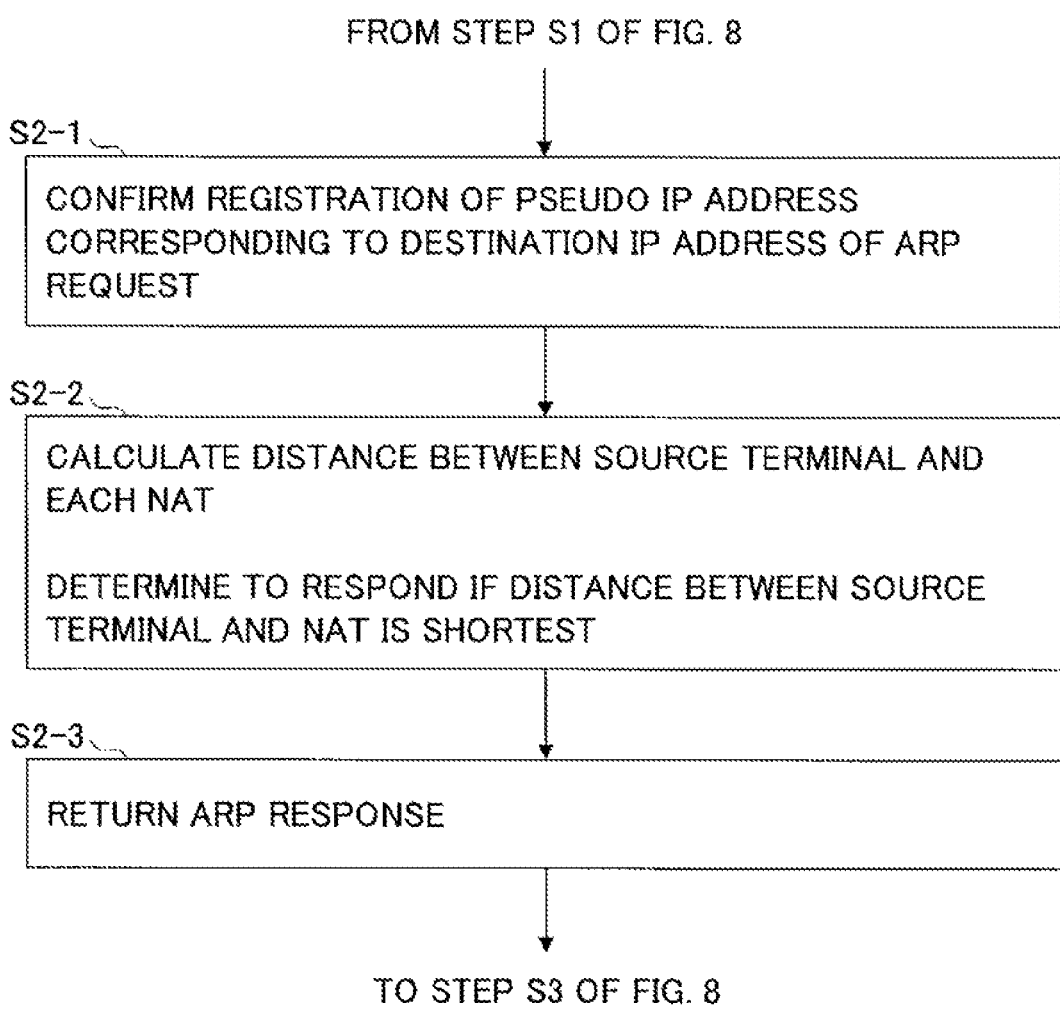
FIG. 12 is a flowchart for illustrating a packet forwarding operation between subnets in the case of using the distance between a source terminal and a NAT according to the second embodiment.

In the second embodiment, step S2 of the first embodiment illustrated in FIG. 8 may be changed as follows. First, a description is given, with reference to FIG. 12, of the case of using the distance (the number of hops) between a source terminal and a NAT.

In step S2-1, in response to receiving the ARP request, the NATs 11 and 12 check their respective address translation tables 23 for a pseudo IP address corresponding to the destination IP address of the ARP request, and determine that the corresponding IP address is registered (recorded).

In step S2-2, each of the NAT 11 and the NAT 12 has recognized (obtained) the topology information of the subnet 1, containing the positions of the terminals of the subnet 1 and the position of the connection of the other NAT to the subnet 1, using LLDP and SNMP. Each of the NAT 11 and the NAT 12 calculates the distance from the source terminal of the ARP request to each of the NAT 11 and the NAT 12 based on the source MAC address of the received ARP request. Here, the NAT (that is, each of the NAT 11 and the NAT 12) determines to return an ARP response if the distance between the NAT and the source terminal is determined to be the shortest (the shorter in this case).

In step S2-3, the NAT to respond to the ARP request returns an ARP response containing the MAC address of the NAT as a MAC address corresponding to the target IP address, that is, the destination IP address (the pseudo IP address of the terminal 1-6). That is, the NAT returns an address resolution response message (ARP response).

According to this embodiment, the distance from the terminal 1-1 to the NAT 11 is shorter than the distance from the terminal 1-1 to the NAT 12. Therefore, the NAT 11 is selected (as a NAT to respond to the ARP request), and the NAT 11 stores the MAC address assigned to its interface on the subnet 1 side in an ARP response and transmits the ARP response.

Figure 13:
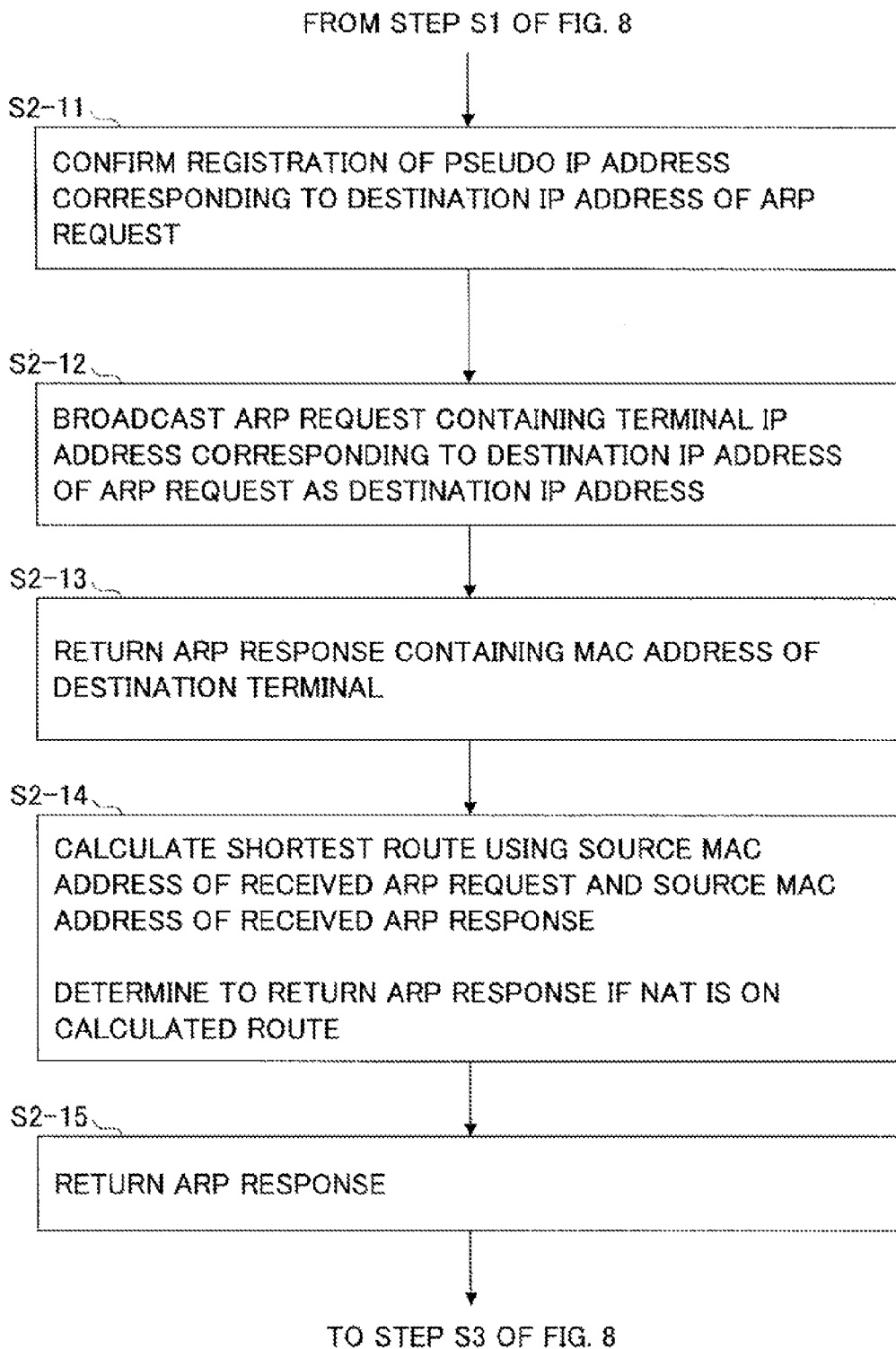
FIG. 13 is a flowchart for illustrating a packet forwarding operation between subnets in the case of using the distance between a source terminal and a destination terminal according to the second embodiment.

Next, a description is given, with reference to FIG. 13, of the case of using the distance (the number of hops) between a source terminal and a destination terminal. In the following, a description is given of the case where the MAC addresses of terminals have been obtained but their IP addresses are not obtained by LLDP.

In step S2-11, in response to receiving the ARP request, the NATs 11 and 12 check their respective address translation tables 23 for a pseudo IP address corresponding to the destination IP address of the ARP request, and determine that the corresponding IP address is registered (recorded).

In step S2-12, each of the NATs 11 and 12 extracts the source MAC address and the destination IP address of the received ARP request. Since the destination IP address of the ARP request is a pseudo IP address, each of the NATs 11 and 12 determines a terminal IP address (real IP address) corresponding to the pseudo IP address from the destination address translation table (the address translation table 23). Each of the NATs 11 and 12 broadcasts an ARP request containing the terminal IP address as a target IP address, that is, as a destination IP address, to the subnet 2.

In step S2-13, in response to receiving the ARP request, the destination terminal returns an ARP response containing its MAC address.

Each of the NAT 11 and the NAT 12 has recognized (obtained) the topology information of the connected subnets 1 and 2, containing the positions of the terminals of the subnets 1 and 2 and the positions of the connections of the other NAT to the subnets 1 and 2, using LLDP and SNMP. In step S2-14, each of the NAT 11 and the NAT 12 calculates (determines) the shortest route using the source MAC address of the ARP request received in step S2-11 and the source MAC address of the ARP response received in step S2-13. Here, the NAT (that is, each of the NAT 11 and the NAT 12) determines to return an ARP response if the NAT is on the calculated (shortest) route.

In step S2-15, the NAT to respond to the ARP request returns an ARP response containing the MAC address of the NAT as a MAC address corresponding to the target IP address, that is, the destination IP address (the pseudo IP address of the terminal 1-6). That is, the NAT returns an address resolution response message (ARP response).

According to this embodiment, the NAT 11 is on the shortest route between the source terminal and the destination terminal (from the terminal 1-1 to the Layer-2 switches 2-1 and 2-2 to the NAT 11 to the Layer-2 switches 2-7, 2-8, and 2-12 to the terminal 1-10). Therefore, the NAT 11 is selected (as a NAT to respond to the ARP request), and the NAT 11 stores the MAC address assigned to its interface on the subnet 1 side in an ARP response and transmits the ARP response.

[c] Third Embodiment

Figure 14:
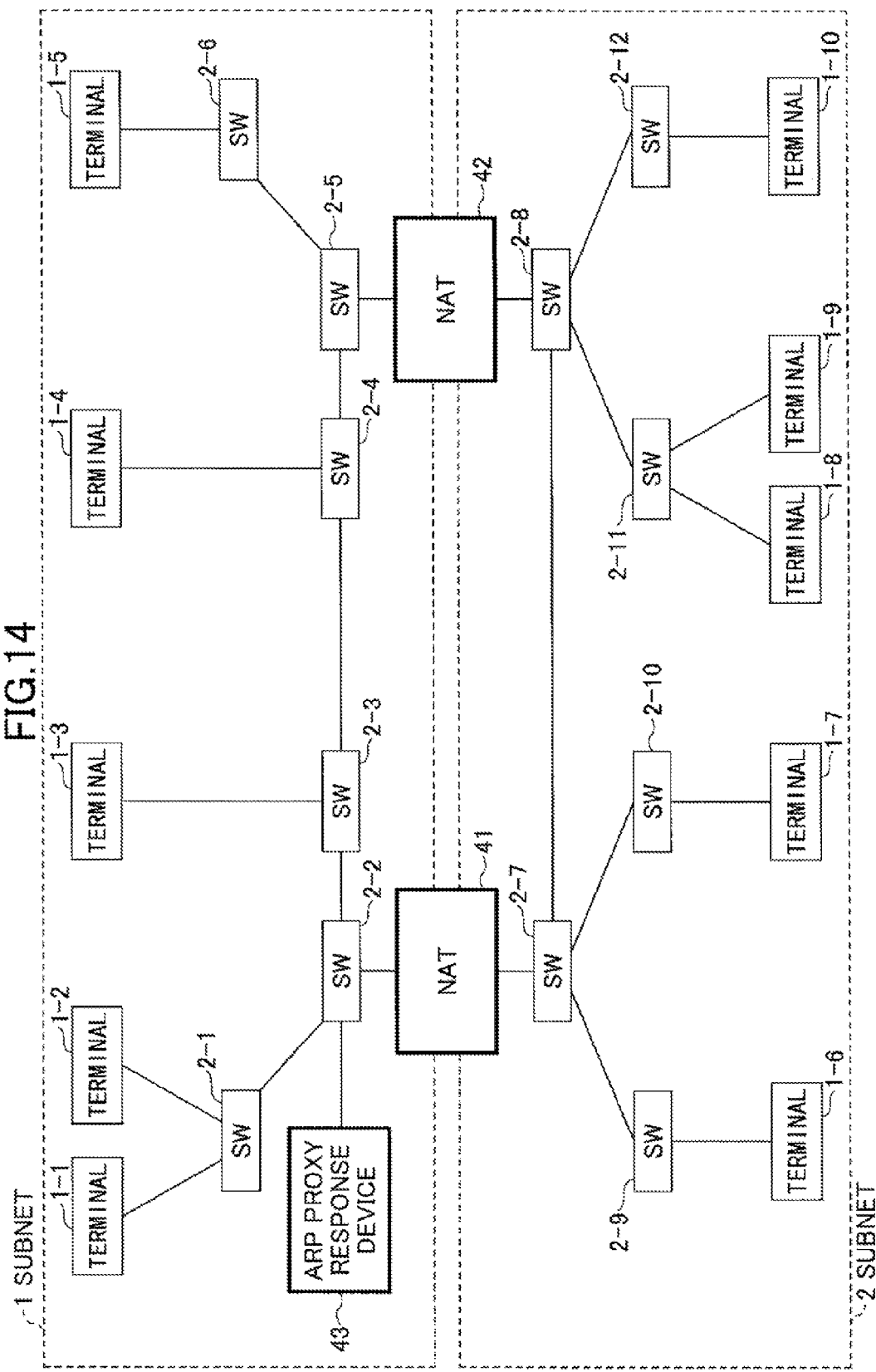
FIG. 14 is a diagram illustrating a network configuration in which multiple networks are connected according to a third embodiment.

FIG. 14 is a diagram illustrating a network configuration in which multiple networks are connected according to a third embodiment. In FIG. 14, the subnet 1 includes the terminals 1-1 through 1-5 and the Layer-2 switches 2-1 through 2-6. The subnet 2 includes the terminals 1-6 through 1-10 and the Layer-2 switches 2-7 through 2-12.

The subnet 1 and the subnet 2 are networks having IP address spaces independent of each other. The subnet 1 and the subnet 2 are connected by a NAT 41 and a NAT 42. The NAT 41 is connected to the Layer-2 switches 2-2 and 2-7, and the NAT 42 is connected to the Layer-2 switches 2-5 and 2-8.

The NAT 41 and the NAT 42 retain an address translation table in order to connect communications between a group of terminals in the subnet 1 and a group of terminals in the subnet 2. For example, the NAT 41 and the NAT 42 retain a pseudo IP address for the terminal 1-6. The pseudo IP address of the terminal 1-6 is defined in the IP address space of the subnet 1, to which the NAT 41 and the NAT 42 belong. The subnet 41 and the subnet 42 may be connected by three or more NATs.

Referring to FIG. 14, an ARP proxy response device 43 configured to make an ARP response is provided in the subnet 1. The ARP proxy response device 43 is connected to, for example, the Layer-2 switch 2-2. By thus providing the ARP proxy response device 43 that makes an ARP response in place of the NAT 11 and the NAT 12 in the subnet 1, it is possible to distribute NAT operational loads in a forwarding operation and to forward data in the shortest route without adding the functions defined in the first embodiment to either the NAT 41 or the NAT 42.

Of the configuration of the address translation device corresponding to the NATs 11 and 12 illustrated in FIG. 7, the address translation table 23, the packet reception part 31, the packet transmission part 32, and the address translation part 33 are included in each of the NATs 41 and 42. As illustrated in FIG. 15, the NATs 41 and 42 have the address translation tables 23 of the same contents. Further, in the ARP proxy response device 43, the MAC addresses of the NATs 41 and 42 and a list of the pseudo IP addresses belonging to the subnet 1 retained by the NATs 41 and 42 are registered with (recorded in) the address translation information database 25.

Figure 16:
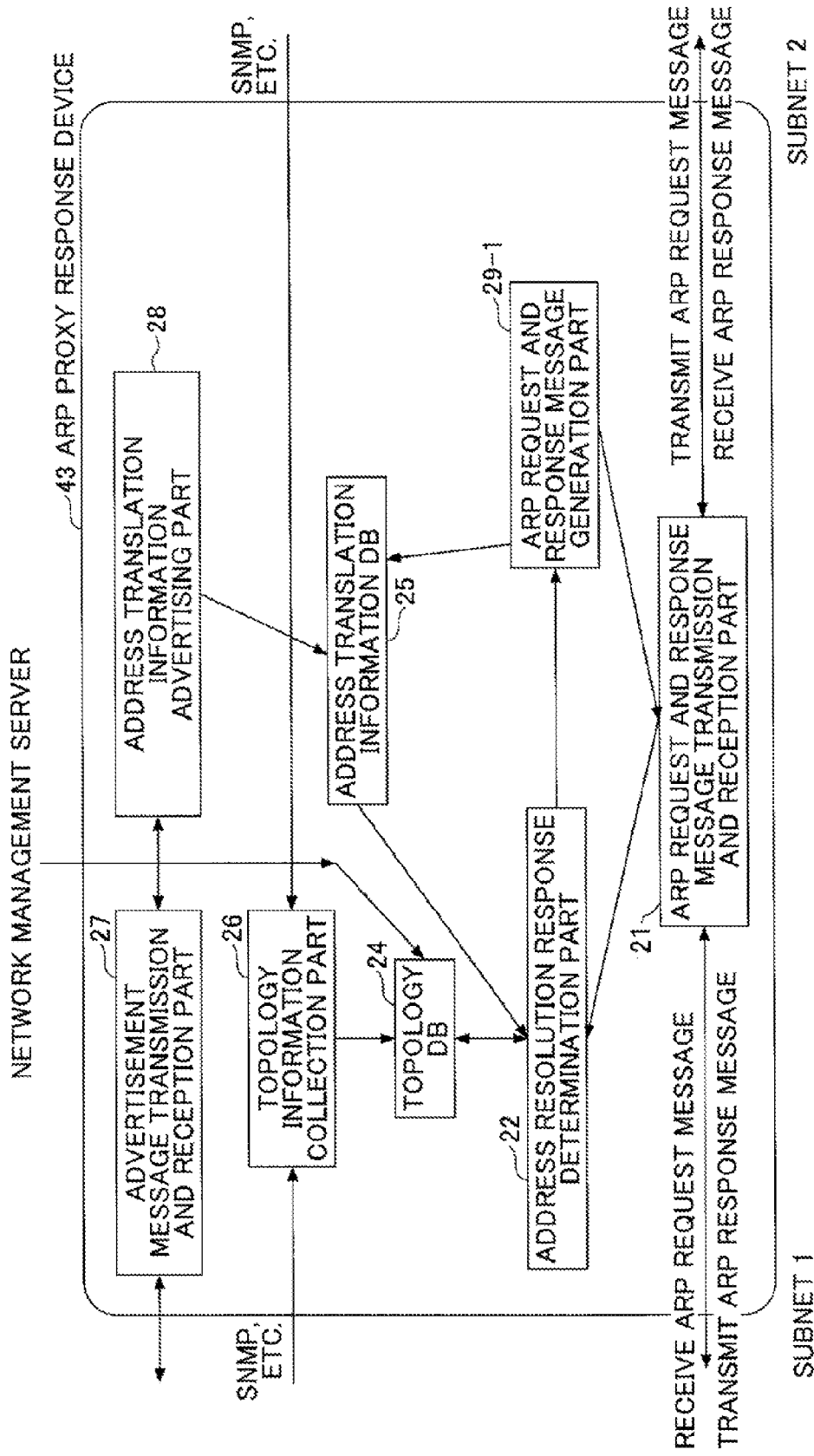
FIG. 16 is a diagram illustrating a configuration of an ARP proxy response device according to the third embodiment.

FIG. 16 is a diagram illustrating a configuration of the ARP proxy response device 43 according to this embodiment. In FIG. 16, the same elements as those in FIG. 7 are referred to by the same reference numerals. As is seen from the comparison of FIG. 16 with FIG. 7, the ARP proxy response device 43 may be configured by removing the address translation table 23, the packet reception part 31, the packet transmission part 32, and the address translation part 33 from the address translation device of FIG. 7.

However, an ARP request and response message generation part 29-1 is different from the ARP request and response message generation part 29 in using, instead of its MAC address, the MAC address assigned to the NAT 41 or the NAT 42, obtained by the technique of one of the following rules, as a target MAC address to be contained in the ARP response message.

According to a first rule, the address translation device (NAT) is determined based on a result such as a hash value obtained using a hashing function that takes as input the source MAC address of the APR request message.

According to a second rule, an address translation device whose distance to a source terminal of the ARP request message is the shortest is selected.

According to a third rule, an address translation device on the shortest distance (route) between a source terminal of the ARP request message and a terminal corresponding to the pseudo IP address indicated by the target IP address (that is, a destination terminal) is selected.

A description is given of a packet forwarding operation between the subnets 1 and 2.

Figure 17:
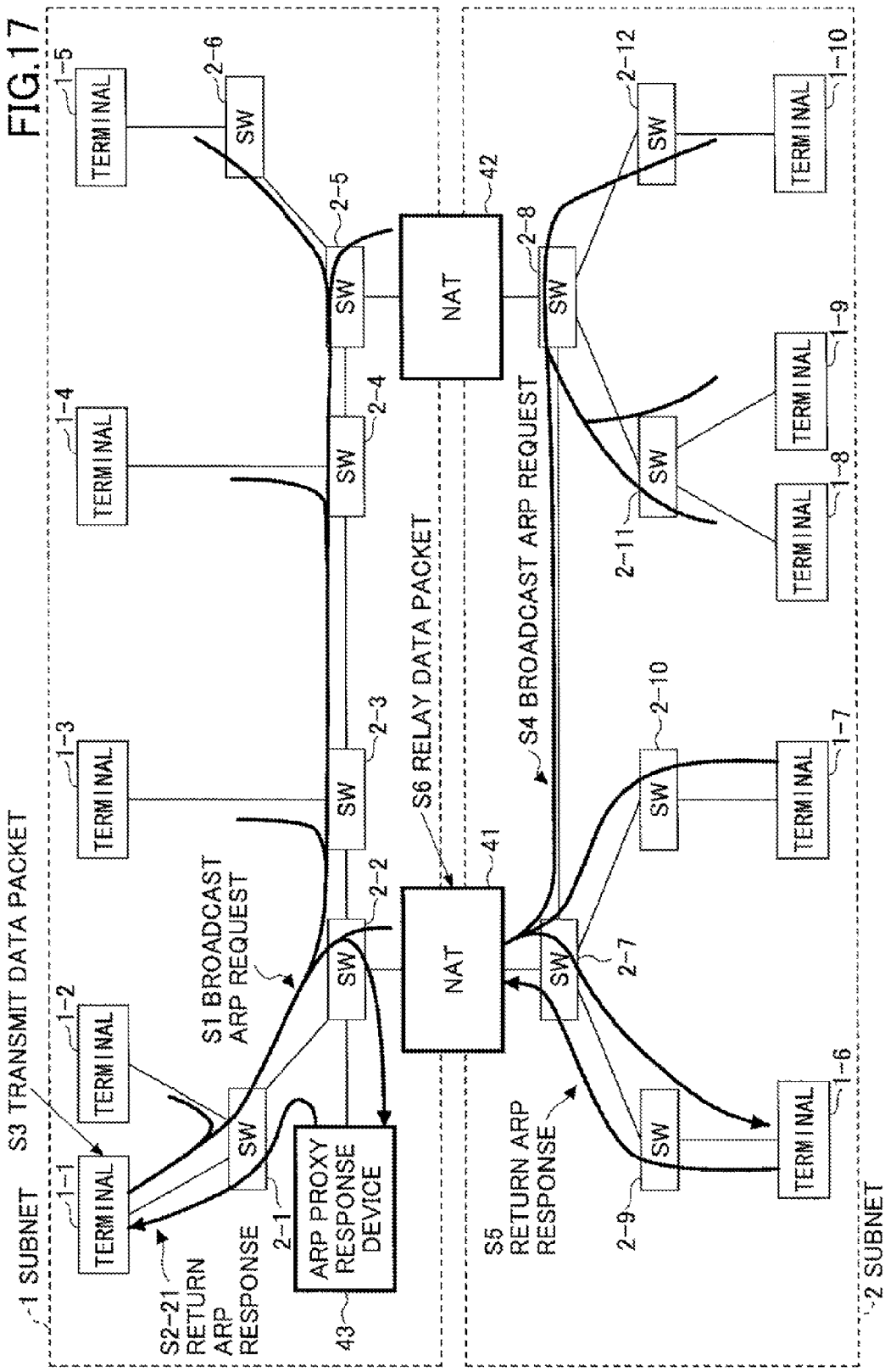
FIG. 17 is a diagram illustrating a packet forwarding operation according to the third embodiment.

A description is given, with reference to FIG. 17, of an operation of forwarding a packet from the terminal 1-1 of the subnet 1 to the terminal 1-6 of the subnet 2. In the following description, parenthesized step numbers correspond to those in FIG. 17. Further, the same steps as those of FIG. 8 are described with the same step numbers.

In step S1, the terminal 1-1 broadcasts an ARP request message (ARP request) to the pseudo IP address of the terminal 1-6 in the subnet 1.

In step S2-21, the NAT 41 and the NAT 42 do not return a response to the ARP request even if the pseudo IP address is recorded in their address translation tables 23. In response to receiving the ARP request, the ARP proxy response device 43 checks the retained pseudo IP address list for a pseudo IP address corresponding to the destination IP address of the ARP request, and determines that the corresponding pseudo IP address is registered (recorded). Then, the ARP proxy response device 43 determines a hash value using a hashing function that takes as input the source MAC address of the ARP request, and determines based on the hash value whether to respond to or ignore the ARP request.

As a simple example, since the networks are connected by two NATs in this embodiment, the source MAC address is divided by two, and the remainder is determined as a hash value. It may be determined that the NAT 41 respond to the ARP request if the hash value is zero and that the NAT 42 respond to the ARP request if the hash value is one. In responding by proxy to the ARP request, the ARP proxy response device 43 returns an ARP response containing the MAC address of the NAT for which the ARP proxy response device 43 is proxy as a MAC address corresponding to the target IP address (the pseudo IP address of the terminal 1-6). In this embodiment, the NAT 41 is selected based on the hash value, and the ARP proxy response device 43 stores the MAC address of the NAT 41 in an ARP response and transmits the ARP response.

In step S3, in response to receiving the ARP response, the terminal 1-1 generates a data packet having the pseudo IP address of the terminal 1-6 as a destination IP address, the MAC address of the NAT 41 as a destination MAC address, the IP address of the terminal 1-1 as a source IP address, and the MAC address of the terminal 1-1 as a source MAC address, and forwards the generated data packet to the NAT 41.

In step S4, the NAT 41 receives the data packet having its MAC address as a destination MAC address. The NAT 41 searches the address translation table 23 using the destination IP address of the received packet as an input key, and identifies a corresponding terminal real IP address. Then, the NAT 41 broadcasts an ARP request (addressed) to the real IP address of the terminal 1-6 in the subnet 2.

In step S5, the terminal 1-6 receives the ARP request for its MAC address, and returns an ARP response containing the MAC address of the terminal 1-6.

In step S6, in response to receiving the ARP response, the NAT 41 updates the IP header of the previously received data packet (in Step S4) in the following manner. That is, the destination IP address is changed to the real IP address of the terminal 1-6, the destination MAC address is changed to the MAC address of the terminal 1-6, the source IP address is changed to the pseudo IP address of the terminal 1-1 obtained by searching the address translation table 23, and the source MAC address is changed to the MAC address assigned to the interface of the NAT 41 on the subnet 2 side. Then, the NAT 41 transmits the data packet with the updated IP header to the terminal 1-6.

The packet forwarding operation between the subnets 1 and 2 of the second embodiment is substantially different from that of the first embodiment in the process of step S2 (of the first embodiment). The above-described process makes it possible to perform NAS load distribution using the ARP proxy response device 43 without functional extensions of an existing NAT.

Further, the same as in the second embodiment, it is possible to cause a NAT at the shortest distance from a source terminal of an ARP request to forward data by causing the ARP proxy response device 43 to collect the topology information of the subnet 1 in advance using LLDP and SNMP, the topology information containing the positions of the terminals of the subnet 1 and the positions of the connections of NATs to the subnet 1, and calculate the distance between the source terminal of the ARP request and each NAT based on the source MAC address of the received ARP request. That is, in step S2-21, in response to receiving the ARP request, the ARP proxy response device 43 may calculate the distance between the source terminal of the ARP request and each NAT based on the source MAC address of the received ARP request, and select a NAT at the shortest distance from the source terminal of the ARP request. The ARP proxy response device 43 may return an ARP response containing the MAC address of the selected NAT as a MAC address corresponding to the target IP address, that is, the destination IP address. As a result, it is possible to cause the source terminal to transmit data to a NAT at the shortest distance from the source terminal.

[d] Fourth Embodiment

Figure 18:
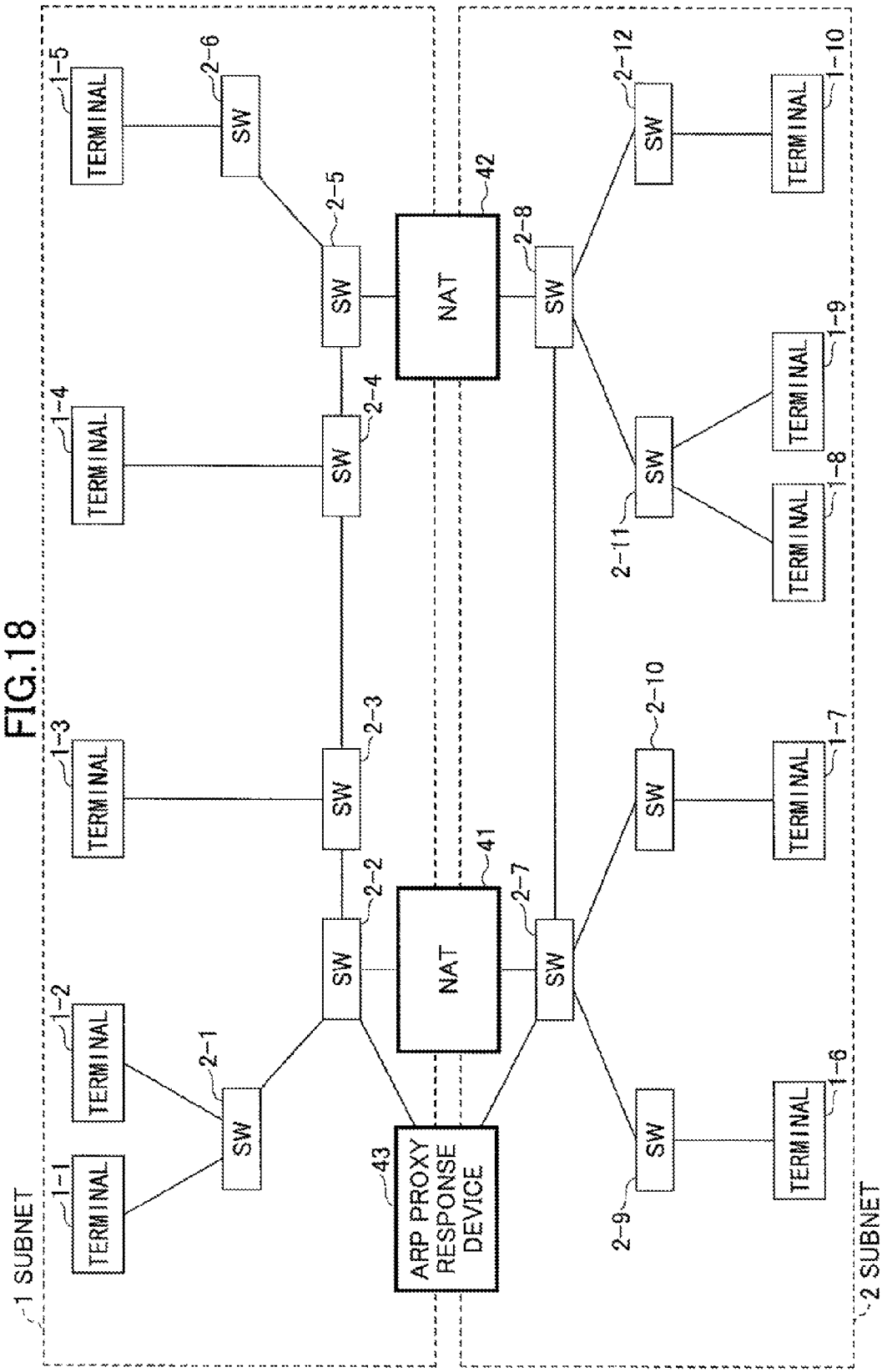
FIG. 18 is a diagram illustrating a network configuration in which multiple networks are connected according to a fourth embodiment.

FIG. 18 is a diagram illustrating a network configuration in which multiple networks are connected according to a fourth embodiment. FIG. 18 is different from FIG. 14 in that the APR proxy response device 43 configured to make an ARP response is connected the Layer-2 switch 2-7 of the subnet 2 as well as the Layer-2 switch 2-1 of the subnet 1.

The NAT 41 and the NAT 42 retain the address translation tables 23 of the same contents as illustrated in FIG. 15. In the ARP proxy response device 43, the MAC addresses of the NATs 41 and 42 and a list of the pseudo IP addresses belonging to the subnets 1 and 2 retained by the NATs 41 and 42 are registered with (recorded in) the address translation information database 25.

Like the NAT of the second embodiment, the ARP proxy response device 43 is configured to collect the topology information of the subnets 1 and 2 in advance using LLDP and SNMP, the topology information containing the positions of the terminals of the subnets 1 and 2 and the positions of the connections of the NATs 41 and 42 to the subnets 1 and 2. The topology information is recognized based on the attribute information of the Layer-2 switches and the terminals connected to the ports of the Layer-2 switches collected using LLDP. Further, the position information of the terminals and the NATs includes at least the MAC addresses of the connection ports of the Layer-2 switches and the terminals. By collecting such information using SNMP, it is possible to recognize (obtain) the topology information of the entire subnets 1 and 2.

A description is given of a packet forwarding operation between the subnets 1 and 2.

A description is given, with reference to FIG. 19, of an operation of forwarding a packet from the terminal 1-1 of the subnet 1 to the terminal 1-6 of the subnet 2. In the following description, parenthesized step numbers correspond to those in FIG. 19. Further, the same steps as those of FIG. 8 are described with the same step numbers.

In step S1, the terminal 1-1 broadcasts an ARP request message (ARP request) to the pseudo IP address of the terminal 1-6 in the subnet 1.

The NAT 41 and the NAT 42 do not return a response to the ARP request even if the pseudo IP address is recorded in their address translation tables 23. In response to receiving the ARP request, the ARP proxy response device 43 executes the following process in place of the NAT 41 or the NAT 42, and returns an ARP response.

In step S2-31, the ARP proxy response device 43 checks the retained pseudo IP address list for a pseudo IP address corresponding to the destination IP address of the ARP request, and determines that the corresponding pseudo IP address is registered (recorded).

In step S2-32, the ARP proxy response device 43 extracts the source MAC address and the destination IP address of the received ARP request. Since the destination IP address of the ARP request is a pseudo IP address, the ARP proxy response device 43 determines a terminal IP address (real IP address) corresponding to the pseudo IP address from the address translation information database 25. The ARP proxy response device 43 broadcasts an ARP request containing the terminal IP address as a target IP address, that is, as a destination IP address, to the subnet 2.

In step S2-33, in response to receiving the ARP request, the destination terminal returns an ARP response containing its MAC address.

The ARP proxy response device 43 has recognized (obtained) the topology information of the connected subnets 1 and 2, containing the positions of the terminals of the subnets 1 and 2 and the positions of the connections of the NATs 41 and 42 to the subnets 1 and 2, using LLDP and SNMP. In step S2-34, the ARP proxy response device 43 calculates (determines) the shortest route using the source MAC address of the ARP request received in step S2-31 and the source MAC address of the ARP response received in step S2-33. The ARP proxy response device 43 returns an ARP response containing the MAC address of the NAT (the NAT 41 or the NAT 42) on the calculated (shortest) route.

In step S3, in response to receiving the ARP response, the terminal 1-1 generates a data packet having the pseudo IP address of the terminal 1-6 as a destination IP address, the MAC address of the NAT 41 as a destination MAC address, the IP address of the terminal 1-1 as a source IP address, and the MAC address of the terminal 1-1 as a source MAC address, and forwards the generated data packet to the NAT 41.

In step S4, the NAT 41 receives the data packet having its MAC address as a destination MAC address. The NAT 41 searches the address translation table 23 using the destination IP address of the received packet as an input key, and identifies a corresponding terminal real IP address. Then, the NAT 41 broadcasts an ARP request (addressed) to the real IP address of the terminal 1-6 in the subnet 2.

In step S5, the terminal 1-6 receives the ARP request for its MAC address, and returns an ARP response containing the MAC address of the terminal 1-6.

In step S6, in response to receiving the ARP response, the NAT 41 updates the IP header of the previously received data packet (in Step S4) in the following manner. That is, the destination IP address is changed to the real IP address of the terminal 1-6, the destination MAC address is changed to the MAC address of the terminal 1-6, the source IP address is changed to the pseudo IP address of the terminal 1-1 obtained by searching the address translation table 23, and the source MAC address is changed to the MAC address assigned to the interface of the NAT 41 on the subnet 2 side. Then, the NAT 41 transmits the data packet with the updated IP header to the terminal 1-6.

The packet forwarding operation between the subnets 1 and 2 of the fourth embodiment is substantially different from that of the third embodiment in the process of step S2-21 (of the third embodiment). The above-described process makes it possible to perform NAS load distribution using the ARP proxy response device 43 without functional extensions of an existing NAT.

A predetermined one of multiple NATs may behave as the ARP proxy response device 43. Alternatively, one of multiple NATs that have advertised a keepalive message as described in the first embodiment may be automatically selected as the ARP proxy response device 43 by a certain rule. Examples of the rule include selecting a NAT whose ID has the smallest value as the ARP proxy response device 43.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. An address translation device, comprising:
    an address translation part containing information on correspondence between pseudo addresses and real addresses of a first network and a second network having respective address spaces independent of each other, the first network and the second network being connected by a plurality of address translation devices including said address translation device;
    an address translation request reception part configured to receive an address translation request with respect to a pseudo IP address contained in the address translation part;
    an address resolution response determination part configured to determine whether to respond to the address translation request in accordance with a predetermined rule based on a source address of the received address translation request;
    a response part configured to respond to the address translation request based on a determination by the address resolution response determination part; and
    a topology storage part containing topology information of one of the first network and the second network,
    wherein the address resolution response determination part is configured to calculate a network condition value between a source terminal of the address translation request and the address translation device based on the source address of the received address translation request and the topology information, and to determine whether to respond to the address translation request in accordance with the network condition value.

2. The address translation device as claimed in claim 1, wherein the topology information is set in the topology storage part by a network management server external to the address translation device.

3. The address translation device as claimed in claim 1, further comprising:
a collection part configured to collect management information of a protocol by which connections of switches, terminals, and the address translation devices in the one of the first network and the second network are found, and to store the collected management information in the topology storage part as the topology information.

4. The address translation device as claimed in claim 1, further comprising:
a keepalive notification part configured to transmit a keepalive notification containing an address of the address translation device; and
a part configured to recognize a number of the address translation devices connecting the first network and the second network by receiving keepalive notifications from other address translation devices.

5. The address translation device as claimed in claim 1, further comprising:
an address list transmission part configured to transmit an address list containing the pseudo IP addresses contained in the address translation part; and
a pseudo IP address storage part configured to receive an address list transmitted from one or more of the other address translation devices, and to store pseudo IP addresses contained in the received address list.

6. The address translation device as claimed in claim 1,
wherein the network condition value is one of a number of hops, a distance, and a delay time, and
wherein the address resolution response determination part is configured to determine to respond to the address translation request when the one of the number of hops, the distance, and the delay time is smallest or shortest among the plurality of address translation devices.

7. An address translation proxy response device configured to respond to an address translation request in place of a plurality of address translation devices connecting a first network and a second network having address spaces independent of each other, the address translation devices each including an address translation part containing information on correspondence between pseudo addresses and real addresses of the first network and the second network, the address translation proxy response device comprising:
a pseudo address storage part configured to store the pseudo IP addresses contained in the address translation parts of the address translation devices;
an address translation request reception part configured to receive the address translation request with respect to a pseudo IP address contained in the address translation parts of the address translation devices;
an address resolution response determination part configured to determine one of the address translation devices to respond to the address translation request in accordance with a predetermined rule based on a source address of the received address translation request;
a response part configured to respond to the address translation request by storing an address of the one of the address translation devices determined by the address resolution response determination part in a response to the address translation request; and
a topology storage part containing topology information of one of the first network and the second network which one is connected to the address translation proxy response device,
wherein the address resolution response determination part is configured to calculate a network condition value between a source terminal of the address translation request and each of the address translation devices based on the source address of the received address translation request and the topology information, and to determine one of the address translation devices to respond to the address translation request in accordance with the network condition value.

8. The address translation proxy response device as claimed in claim 7,
wherein the network condition value is one of a number of hops, a distance, and a delay time, and
wherein the address resolution response determination part is configured to determine one of the address translation devices with respect to which the one of the number of hops, the distance, and the delay time is smallest or shortest as the one of the address translation devices to respond to the address translation request.

9. An address translation method, comprising:
receiving, by a computer processor, an address translation request with respect to a pseudo IP address contained in an address translation part of an address translation device, the address translation part containing information on correspondence between pseudo addresses and real addresses of a first network and a second network having respective address spaces independent of each other, the first network and the second network being connected by a plurality of address translation devices including said address translation device;
determining, by the computer processor, whether to respond to the address translation request in accordance with a predetermined rule based on a source address of the received address translation request; and
responding, by the computer processor, to the address translation request based on a determination by said determining,
wherein, in said determining, a network condition value between a source terminal of the address translation request and the address translation device is calculated based on the source address of the received address translation request and topology information of one of the first network and the second network, and it is determined whether to respond to the address translation request in accordance with the network condition value.

10. An address translation proxy response method for an address translation proxy response device responding to an address translation request in place of a plurality of address translation devices connecting a first network and a second network having address spaces independent of each other, the address translation devices each including an address translation part containing information on correspondence between pseudo addresses and real addresses of the first network and the second network, the address translation proxy response method comprising:
storing the pseudo IP addresses contained in the address translation parts of the address translation devices;
receiving the address translation request with respect to a pseudo IP address contained in the address translation parts of the address translation devices;

determining one of the address translation devices to respond to the address translation request in accordance with a predetermined rule based on a source address of the received address translation request; and responding to the address translation request by storing an address of the one of the address translation devices determined by the address resolution response determination part in a response to the address translation request, wherein, in said determining, a network condition value between a source terminal of the address translation request and each of the address translation devices is calculated based on the source address of the received address translation request and topology information of one of the first network and the second network which one is connected to the address translation proxy response device, and one of the address translation devices to respond to the address translation request is determined in accordance with the network condition value.

* * * * *